(12) United States Patent
Summers, II et al.

(10) Patent No.: US 10,191,979 B2
(45) Date of Patent: Jan. 29, 2019

(54) CONVERTING GRAPHICAL DATA-VISUALIZATIONS INTO SONIFIED OUTPUT

(71) Applicant: SAS Institute Inc., Cary, NC (US)

(72) Inventors: Claude Edward Summers, II, Cary, NC (US); Julianna Elizabeth Langston, Durham, NC (US); Jesse Daniel Sookne, Durham, NC (US); Jesse Benjamin Olley, Chapel Hill, NC (US); Kerry Leanne Smith Trout, Cary, NC (US); Cleester Daniel Heath, IV, Clayton, NC (US); Samuel Edward Kalat, Cary, NC (US); Paul William Layne, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/866,960

(22) Filed: Jan. 10, 2018

(65) Prior Publication Data

US 2018/0239821 A1    Aug. 23, 2018

Related U.S. Application Data

(60) Provisional application No. 62/461,024, filed on Feb. 20, 2017.

(51) Int. Cl.
*G06F 3/00* (2006.01)
*G06F 17/30* (2006.01)
*G06F 3/16* (2006.01)

(52) U.S. Cl.
CPC ........ *G06F 17/30769* (2013.01); *G06F 3/167* (2013.01); *G06F 17/30994* (2013.01)

(58) Field of Classification Search
CPC .......................... G06F 17/30769; G06F 3/167
(Continued)

(56) References Cited

U.S. PATENT DOCUMENTS

| 3,874,097 A | 4/1975 | Mauch |
| 5,097,326 A | 3/1992 | Meijer |

(Continued)

OTHER PUBLICATIONS

Brown et al., "Design Guidelines for Audio Presentation of Graphs and Tables" Proceedings of the 2003 International Conference on Auditory Display, Boston MA, USA, (Jul. 6-9, 2003) 5 pages.

(Continued)

*Primary Examiner* — Andrey Belousov
(74) *Attorney, Agent, or Firm* — Kilpatrick Townsend & Stockton LLP

(57) ABSTRACT

Graphical data-visualizations can be converted into sonified output. For example, a computing device can detect metadata that describes data points for a graphical visualization. The computing device can generate an interactive interface that is different from the graphical visualization based on the metadata. The interactive interface may include a matrix of cells corresponding to the data points in the metadata. The computing device can detect an interaction with a cell in the matrix. The interaction can indicate that a sonified representation of a data point corresponding to the cell is to be output. The computing device can responsively determine at least two sound characteristics for the sonified representation of the data point using a portion of the metadata describing the data point. The at least two sound characteristics can each audibly represent different aspects of the data point. The computing device can then cause the sonified representation to be output.

30 Claims, 21 Drawing Sheets

(58) Field of Classification Search
USPC .......................................... 715/234, 728, 729
See application file for complete search history.

(56) References Cited

U.S. PATENT DOCUMENTS

| | | | |
|---|---|---|---|
| 5,371,854 | A | 12/1994 | Kramer |
| 5,991,781 | A | 11/1999 | Nielsen |
| 6,023,688 | A | 2/2000 | Ramachandran et al. |
| 6,501,779 | B1 | 12/2002 | McLaughlin |
| 6,537,233 | B1 | 3/2003 | Rangayyan |
| 6,920,608 | B1 | 7/2005 | Davis |
| 6,963,656 | B1 | 11/2005 | Persaud |
| 7,138,575 | B2 | 11/2006 | Childs et al. |
| 8,529,838 | B2 | 9/2013 | Drucker et al. |
| 8,529,841 | B2 | 9/2013 | Drucker et al. |
| 8,605,141 | B2 | 12/2013 | Dialameh et al. |
| 8,749,553 | B1 | 6/2014 | Krasovsky et al. |
| 8,832,549 | B2 | 9/2014 | Mansfield et al. |
| 8,910,036 | B1 | 12/2014 | Cromwell |
| 9,430,954 | B1* | 8/2016 | Dewhurst ............ G09B 21/007 |
| 9,785,336 | B2 | 10/2017 | Summers, II et al. |
| 2003/0098803 | A1 | 5/2003 | Gourgey et al. |
| 2003/0134256 | A1 | 7/2003 | Tretiakoff |
| 2004/0138569 | A1 | 7/2004 | Grunwald et al. |
| 2004/0218451 | A1 | 11/2004 | Said |
| 2006/0286533 | A1 | 12/2006 | Hansen |
| 2007/0165019 | A1 | 7/2007 | Hale |
| 2008/0058894 | A1 | 3/2008 | Dewhurst |
| 2008/0086679 | A1 | 4/2008 | Gazzillo et al. |
| 2009/0254859 | A1 | 10/2009 | Arrasvuori |
| 2010/0013861 | A1 | 1/2010 | Saft et al. |
| 2011/0010646 | A1 | 1/2011 | Usey |
| 2011/0266357 | A1 | 11/2011 | Orcutt et al. |
| 2011/0301943 | A1 | 12/2011 | Patch |
| 2012/0046947 | A1 | 2/2012 | Fleizach |
| 2012/0054095 | A1 | 3/2012 | Lesandro et al. |
| 2014/0053055 | A1* | 2/2014 | Summers, II ............ G09B 5/02 715/234 |
| 2014/0310610 | A1 | 10/2014 | Ricci |
| 2015/0242096 | A1 | 8/2015 | Carro |
| 2016/0309081 | A1 | 10/2016 | Frahm |
| 2017/0039194 | A1 | 2/2017 | Tschetter |

OTHER PUBLICATIONS

Fiorella Terenzi Home Page retrieved on May 31, 2017 from http://www.fiorella.com/projects.html#galaxies 5 pages.

IBM Rave—Rapidly Adaptive Visualization Engine, Cognos User Group Discussion, Presented by Scott Fairbanks (Apr. 24, 2014) 28 pages.

Vernier Software & Technology, "Logger Pro 3 Demo" retrieved from https://www.vernier.com/downloads/logger-pro-demo/ (2017) 9 pages.

GT Sonification Lab, School of Psychology—Georgia Institute of Technology "Sonification Sandbox" (2009) 3 pages.

Gintautas Daunys and Vidas Lauruska "Sonification System of Maps for Blind" Siauliai University Lithuania (2008) 11 pages.

Wanda Diaz Merced "How a blind astronomer found a way to hear the stars" retrieved from https://remezcia.com/tag/stem/ (2016) 8 pages.

SAS Institute "New SAS software helps blind users see data in unique way" retrieved from WRAL.com (2017) 2 pages.

GT Sonification Lab, School of Psychology—Georgia Institute of Technology "Auditory Graphs" retrieved from http://sonify.psych.gatech.edu/research/auditorygraphs/ (2018) 4 pages.

EPUB3.0.sub.—Spec.sub.—Overview, retrieved from http://www.idpf.orq/epub/30/spec/epub30-overview.html#efContentDocks3 (2014) 25 pages.

W3C Recommendation Multimedia SVG Tiny 1.2. retrieved from http://www.w3.org/TR/SVGTiny12/multipedia.html (Oct. 2014) 13 pages.

Growther et al., HTML5 in Action cartesian graph (2014) 466 pages.

Pannel et al. "Review of Designs for Haptic Data Visualization", IEEE Transactions of Haptics, vol. X, No. X, (2009) 19 pages.

Crossan et al. "Haptic Granular Synthesis: Targeting, Visualization and Texturing", Proceedings of the Eighth International Conference on Information Visualization (IV'04), published (2004) 6 pages.

Alacam et al. "Verbally Assisted Haptic Graph Comprehension: The Role of Taking Initiative in a Joint Activity", published on the Internet, 2014, http://acarturk.net/wp-content/uploads/Alacam.sub.--Habel.sub.--Acarturk.- sub.--2014a.pdf. (2014) 7 pages.

Fairfield-Carter et al., "Alternative Approaches to Creating Disposition Flow Diagrams", PharmaSUG2011, Paper TT08, file PharmaSUG2011.pdf (2011) 11 pages.

IFEELPIXEL arhived.org recorded www.ifeelpixel.com captured on Apr. 22, 2003, attached as archived Ifeelpixel website 04222003.pdf. (2003) 2 pages.

Non-Final Office Action dated Oct. 23, 2014 for U.S. Appl. No. 13/588,101, 45 pages.

Final Office Action dated May 11, 2015 for U.S. Appl. No. 13/588,101, 39 pages.

Non-Final Office Action dated Sep. 10, 2015 for U.S. Appl. No. 13/588,101, 69 pages.

Final Office Action dated Mar. 11, 2016 for U.S. Appl. No. 13/588,101, 85 pages.

Non-Final Office Action dated Sep. 8, 2016 for U.S. Appl. No. 13/588,101, 91 pages.

Notice of Allowance dated Apr. 18, 2017 for U.S. Appl. No. 13/588,101, 8 pages.

* cited by examiner

CONVERTING GRAPHICAL DATA-VISUALIZATIONS INTO SONIFIED OUTPUT

REFERENCE TO RELATED APPLICATION

This claims the benefit of priority under 35 U.S.C. § 119(e) to U.S. Provisional Patent Application No. 62/461,024, filed Feb. 20, 2017, the entirety of which is hereby incorporated by reference herein.

TECHNICAL FIELD

The present disclosure relates generally to presentation and processing of images. More specifically, but not by way of limitation, this disclosure relates converting graphical data-visualizations into sonified output.

BACKGROUND

Graphical user interfaces (GUIs) can incorporate graphical visualizations to help a user quickly and easily understand information. Examples of graphical visualizations can include graphs, charts, heat maps, histograms, plots, or any combinations of these. But the visual nature of these graphical visualizations make them difficult or impossible to interpret for users that are blind or visually impaired.

SUMMARY

One example of the present disclosure includes a system having a processing device and a memory device on which instructions executable by the processing device are stored. The instructions can cause the processing device to detect metadata that describes a plurality of data points for a graphical visualization that includes a graph or a chart. The instructions can cause the processing device to generate an interactive interface based on the metadata. The interactive interface can be different from the graphical visualization. The interactive interface can include a matrix having a plurality of cells. Each cell in the plurality of cells can correspond to a respective data point among the plurality of data points described by the metadata. The instructions can cause the processing device to detect an interaction with a cell in the matrix. The interaction can indicate that a sonified representation of a data point corresponding to the cell is to be output. The instructions can cause the processing device to, based on detecting the interaction, determine at least two sound characteristics for the sonified representation of the data point using a portion of the metadata describing the data point. The at least two sound characteristics can each audibly represent a different aspect of the data point. The instructions can cause the processing device to transmit an audio signal to an audio device. The audio signal can be configured to cause the audio device to output the sonified representation having the at least two sound characteristics.

Another example of the present disclosure can include a non-transitory computer-readable medium comprising program code that is executable by a processing device. The program code can cause the processing device to detect metadata that describes a plurality of data points for a graphical visualization that includes a graph or a chart. The program code can cause the processing device to generate an interactive interface based on the metadata. The interactive interface can be different from the graphical visualization. The interactive interface can include a matrix having a plurality of cells. Each cell in the plurality of cells can correspond to a respective data point among the plurality of data points described by the metadata. The program code can cause the processing device to detect an interaction with a cell in the matrix. The interaction can indicate that a sonified representation of a data point corresponding to the cell is to be output. The program code can cause the processing device to, based on detecting the interaction, determine at least two sound characteristics for the sonified representation of the data point using a portion of the metadata describing the data point. The at least two sound characteristics can each audibly represent a different aspect of the data point. The program code can cause the processing device to transmit an audio signal to an audio device. The audio signal can be configured to cause the audio device to output the sonified representation having the at least two sound characteristics.

Another example of the present disclosure can include a method involving detecting metadata that describes a plurality of data points for a graphical visualization that includes a graph or a chart. The method can involve generating an interactive interface based on the metadata. The interactive interface can be different from the graphical visualization. The interactive interface can include a matrix having a plurality of cells. Each cell in the plurality of cells can correspond to a respective data point among the plurality of data points described by the metadata. The method can involve detecting an interaction with a cell in the matrix. The interaction can indicate that a sonified representation of a data point corresponding to the cell is to be output. The method can involve, based on detecting the interaction, determining at least two sound characteristics for the sonified representation using a portion of the metadata describing the data point. The at least two sound characteristics can each audibly represent a different aspect of the data point. The method can involve transmitting an audio signal to an audio device. The audio signal can be configured to cause the audio device to output the sonified representation having the at least two sound characteristics. Some or all of the abovementioned method steps can be implemented by a processing device.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
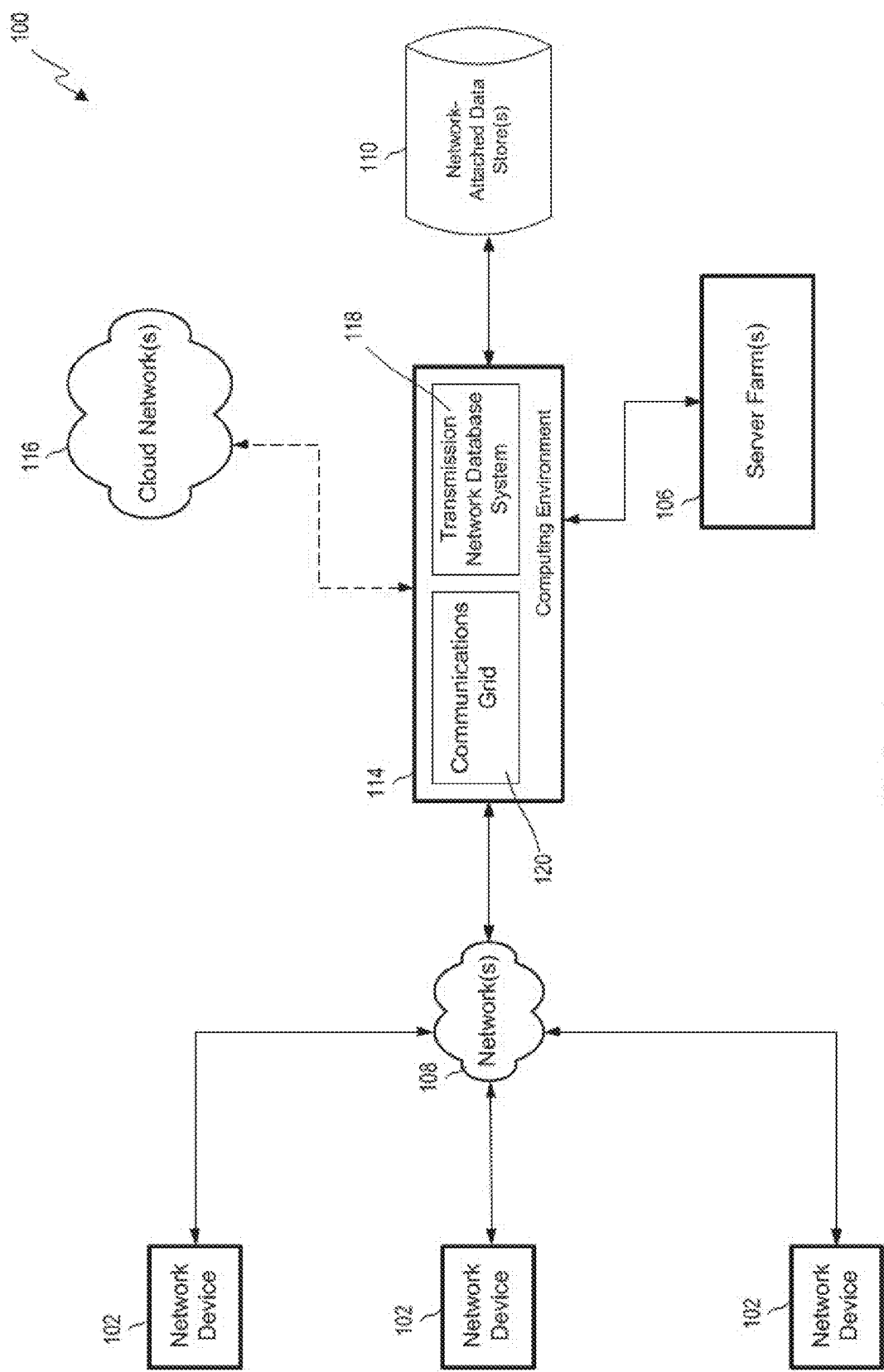
FIG. 1 is a block diagram of an example of the hardware components of a computing system according to some aspects.

In the appended figures, similar components or features can have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of examples of the technology. But various examples can be practiced without these specific details. The figures and description are not intended to be restrictive.

The ensuing description provides examples only, and is not intended to limit the scope, applicability, or configuration of the disclosure. Rather, the ensuing description of the examples provides those skilled in the art with an enabling description for implementing an example. Various changes may be made in the function and arrangement of elements without departing from the spirit and scope of the technology as set forth in the appended claims.

Specific details are given in the following description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples can be described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

Certain aspects and features of the present disclosure relate to converting graphical data-visualizations into sonified output. For example, a computing device can detect metadata that describes data points for a graphical visualization, such as a graph or a chart that is part of a website. The metadata can include, for example, coordinate values for each data point. The metadata may be provided with the graphical visualization (e.g., as part of a website), or provided independently of the graphical visualization (e.g., the graphical visualization may not be provided at all). The computing device can generate an interactive interface based on the metadata. The interactive interface can be different from the graphical visualization, and can be designed to provide information to visually impaired users in a manner that is more easily perceivable for those users. For example, the interactive interface can include a matrix of cells, where each cell corresponds to one or more data points described by the metadata. The matrix of cells can have a color coding and general shape that is easier for visually impaired users to perceive. A visually impaired user can interact with the interactive interface to selectively determine more detailed information about at least one of the data points. For example, the computing device can detect that a user selected a cell in the matrix with a cursor. Based on detecting the selection, the computing device can determine a sonified representation (e.g., a non-speech audio representation) of a data point that corresponds to the cell. The sonified representation of the data point can include two or more sound characteristics that audibly represent different aspects of the data point, such as an X coordinate and a Y coordinate of the data point. The computing device can then cause an audio device to output the sonified representation of the data point. In this manner, a visually impaired user can interact with the interactive interface to hear the sonified representations of data points of interest, enabling the visually impaired user to determine information about the data points that he or she may otherwise be unable to determine (or have difficulty determining).

It can be challenging for visually impaired users to understand with visual content. And different types of visually impaired users may have different needs when it comes to understanding and engaging with visual content. For example, fully blind users may be uninterested in the visual aspects of a graph or chart, but may wish to understand the underlying data or trends represented by the graph or chart. Low vision users may be interested in the visual aspects of a graph or chart, but may require the visuals to be large with lots of contrast. Users with small ranges of vision may want the entire graph or chart to be within their field of view. Some examples of the present disclosure provide an interactive interface that can meet the needs of one or more of the abovementioned types of visually impaired users.

In some examples, the interactive interface can be a compact, high contrast, adjustable visual that can be customized to meet the needs of a visually impaired user. The interactive interface can include a high-contrast frame around the abovementioned matrix of cells, which can enable a visually impaired user to readily identify the boundaries of the matrix of cells. A user can move a cursor within the matrix of cells to play sonified representations of one or more data points associated with each cell. This can enable, for example, a fully blind user to interpret the data point(s). Each sonified representation can include one or more sounds, with each sound having one or more sound characteristics that indicate information about the data point(s). For example, the sonified representation can be a single sound (e.g., a single note) that is panned to indicate an X-coordinate value of the data point and has a pitch indicating a Y-coordinate value of the data point. Some exemplary sound characteristics for X-coordinate values and Y-coordinate values are shown Tables 1 & 2 below:

TABLE 1

X Values VS. Pan Values

| X value | Pan Value (%) |
|---|---|
| 1-100 | 0 |
| 101-200 | 25 |
| 201-300 | 50 |
| 301-400 | 75 |
| 401-500 | 100 | where 0% is completely left panned and 100% is completely right panned. In some examples, after determining which X-value range a particular X-coordinate value falls within, interpolation can be used to determine a specific pan-value for the X-coordinate value.

TABLE 2

Y Values VS. Pitch Values

| Y value | Pitch (Hz) |
|---|---|
| 1-100 | 100 |
| 101-200 | 300 |
| 201-300 | 600 |
| 301-400 | 900 |
| 401-500 | 1200 |

In some examples, after determining which Y-value range a particular Y-coordinate value falls within, interpolation can be used to determine a specific pitch-value for the Y-coordinate value.

The interactive interface can enable a user to move between cells in a variety of ways. For example, a user may be able to move one cell at a time (e.g., along row or column of the matrix of cells) by pressing a directional arrow on the keyboard. The user may also be able to jump to the end or the beginning of a row or column in the matrix by pressing the "Page Up" key or the "Page Down" key. In some examples, the user can jump over multiple cells at once by holding the shift key while pressing a directional arrow. A user may also be able to jump to the local and absolute extrema (e.g., to identify the highest and lowest values, or the next time a trend changes direction) using another keyboard shortcut. In some examples, a user can press can switch between groups of information, which may be represented by different colored lines in a line graph, using yet another keyboard shortcut. The interactive interface can enable any number and combination of the above user interactions to be performed via various keyboard shortcuts or using other modalities.

The interactive interface can be visually customizable so that a user can tailor the interactive interface to his needs. For example, the interactive interface can include settings through which the user can adjust the contrast, size, and shape of the matrix of cells. The audio settings may also be customizable. For example, a user may be able to turn on or off sonification (e.g., the use of non-speech audio to convey information or perceptualize data), and customize which coordinate information is audibly output via sonification. For example, the user may be able to select whether X-coordinate values, Y-coordinate values, Z-coordinate values, or some combination of these are expressed via sonification. In some examples, the user can also turn on or off speech output. The speech output can be provided additionally or alternatively to sonification. For example, if a user selects a certain cell in the matrix of cells, the computing device may implement sonification by outputting a piano note with a particular pan and pitch corresponding to the X and Y coordinates of a related data point. The computing device may also provide speech output about the data point, for example, by speaking the X-coordinate value and the Y-coordinate value of the data point. There may be multiple speech output settings, such as no speech output, a terse setting (e.g., in which only the numerical values for the coordinates of a data point are output), and a verbose setting (e.g., in which the numerical values along with axis labels are output). A user may turn off sonification and turn on speech output if the user wants to quickly obtain exact data-values without the sonication interfering. A user may turn on sonification and turn off speech output if the user wants to listen to the audio notes, without the speech output interfering.

In some examples, the interactive interface may enable a user to compare values between data points or groups of data points. For example, the user can select a graphical user interface (GUI) object to enter a comparison mode and select two data groups to compare. The user can then move the cursor (e.g., left or right) to a particular cell in the matrix of cells and, in response, the computing device can play at least two sounds audibly representing two data points (one data point from each group) related to that cell. In some examples, the sounds can be output simultaneously, such as by transmitting one sound to a left speaker and another sound to a right speaker (e.g., of headphones). This can enable the user to hear the two sounds at the same time. In other examples, the sounds can be output sequentially, allowing the user to quickly contrast each data point against its counterpart in the other group.

In some examples, the interactive interface can be a transparent overlay that is positioned over the graphical visualization. For example, the interactive interface can position a transparent matrix of cells overlaying of the graphical visualization. If a user selects an area (e.g., contacts an area of a touch screen) that corresponds to a cell, the interactive interface can generate a sonified representation of one or more data points in the cell.

In some examples, the interactive interface can be hidden from view and controlled via voice commands. For example, a user may provide one or more voice commands via an audio input device, such as a microphone. The interactive interface can respond to a voice command by taking one or more actions (e.g., changing a setting, outputting a sonified representation of a data point, etc.). Examples of voice commands can include "play right," "play left," "stop," "repeat," "faster," "slower," "speech off", "speech on," "sonification off," "sonification on," "next group," "previous group," "show text description," "show data table," "show visualization," or any combination of these. More, fewer, or different voice commands are also possible.

FIGS. 1-12 depict examples of systems and methods usable for converting graphical data-visualizations into sonified output according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that, in some examples, can collectively be referred to as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages usable for converting graphical data-visualizations into sonified output, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for converting graphical data-visualizations into sonified output to a network-attached data store 110 for storage. The computing environment 114 may later retrieve the data from the network-attached data store 110 and use the data to convert graphical data-visualizations into sonified output.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for converting graphical data-visualizations into sonified output.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for converting graphical data-visualizations into sonified output. For example, the computing environment 114, a network device 102, or both can implement one or more versions of the processes discussed with respect to any of the figures.

Figure 2:
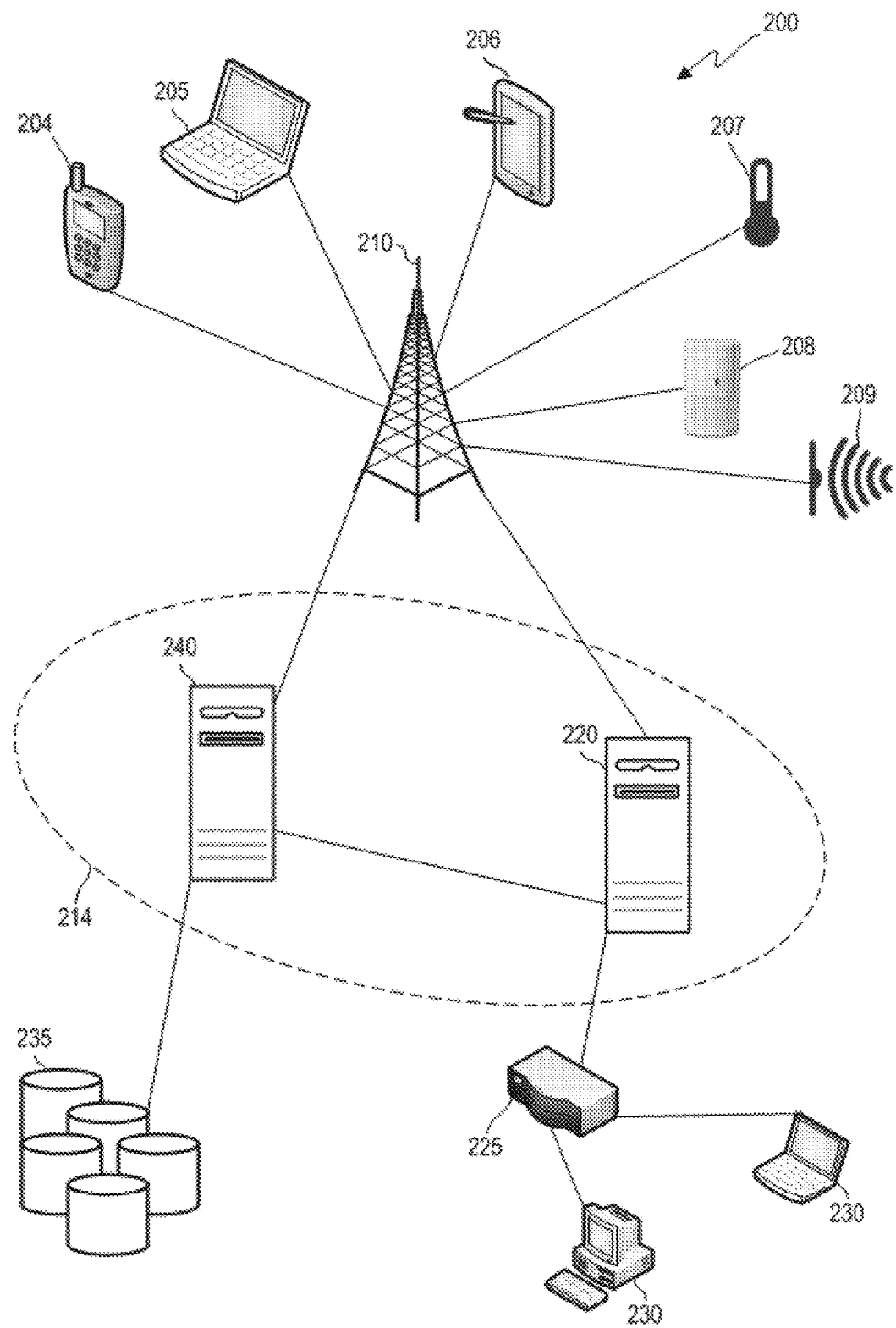
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to convert graphical data-visualizations into sonified output).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as audio data, metadata, data related to a graphical visualization, time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project for converting graphical data-visualizations into sonified output, the computing environment 214 can perform a pre-analysis of data relating to the graphical visualization. The pre-analysis can include determining whether the data is in a correct format and, if not, reformatting the data into the correct format.

Figure 3:
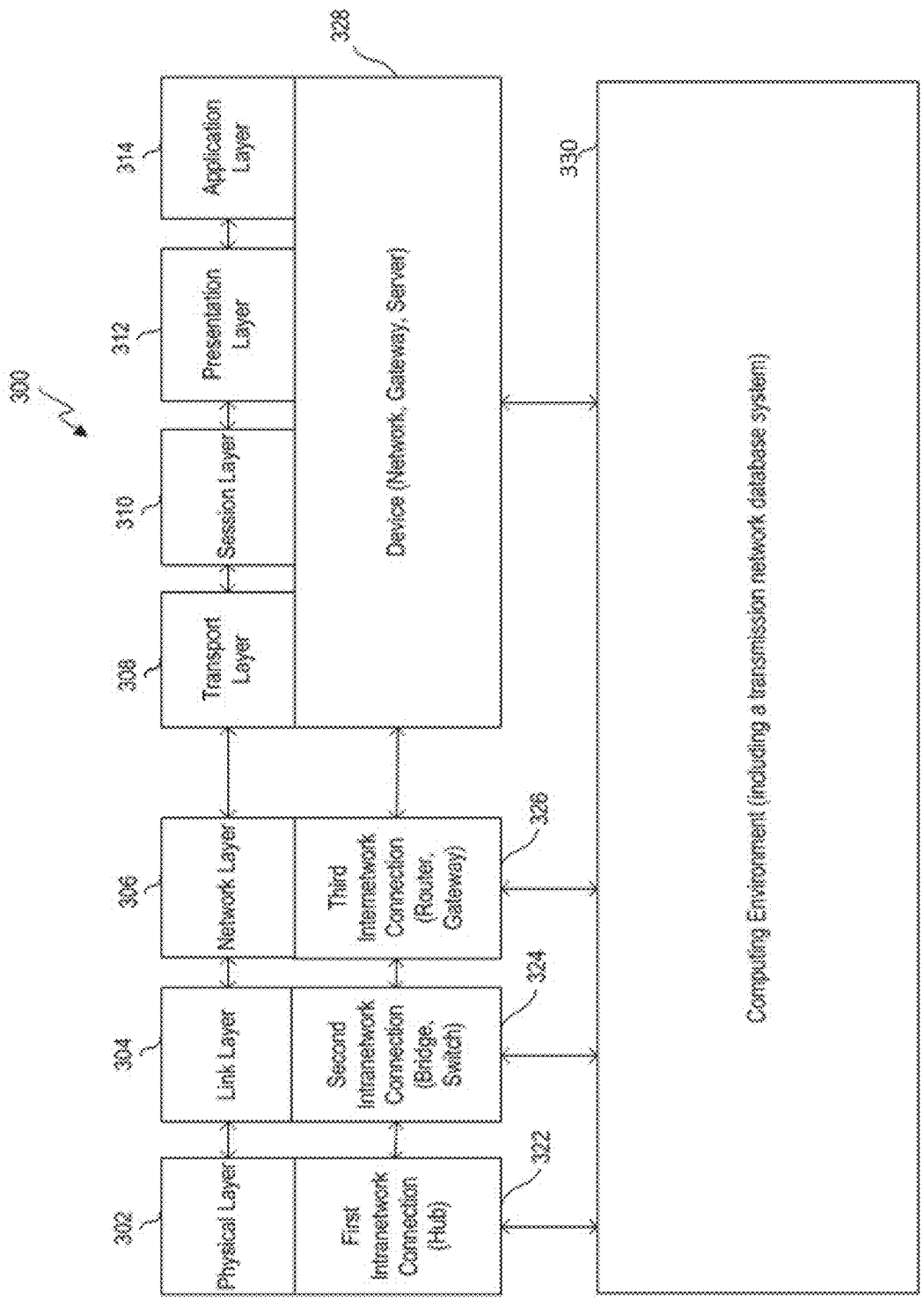
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for converting graphical data-visualizations into sonified output, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for converting graphical data-visualizations into sonified output.

Figure 4:
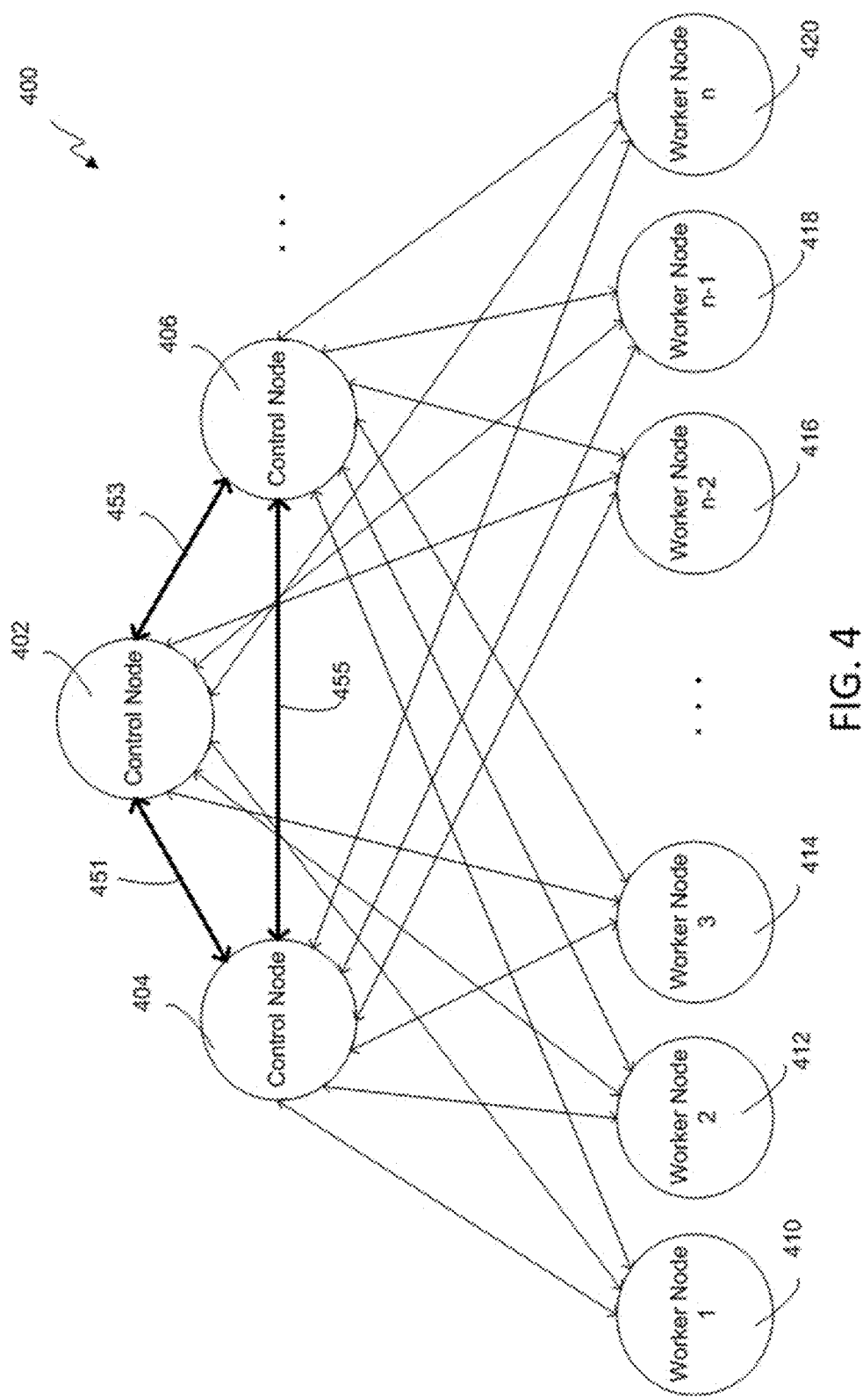
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to converting graphical data-visualizations into sonified output. The project may include the data set related to the graphical visualization. The data set may be of any size. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for converting graphical data-visualizations into sonified output can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may convert a graphical visualization into audio output using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used for converting graphical data-visualizations into sonified output.

Figure 5:
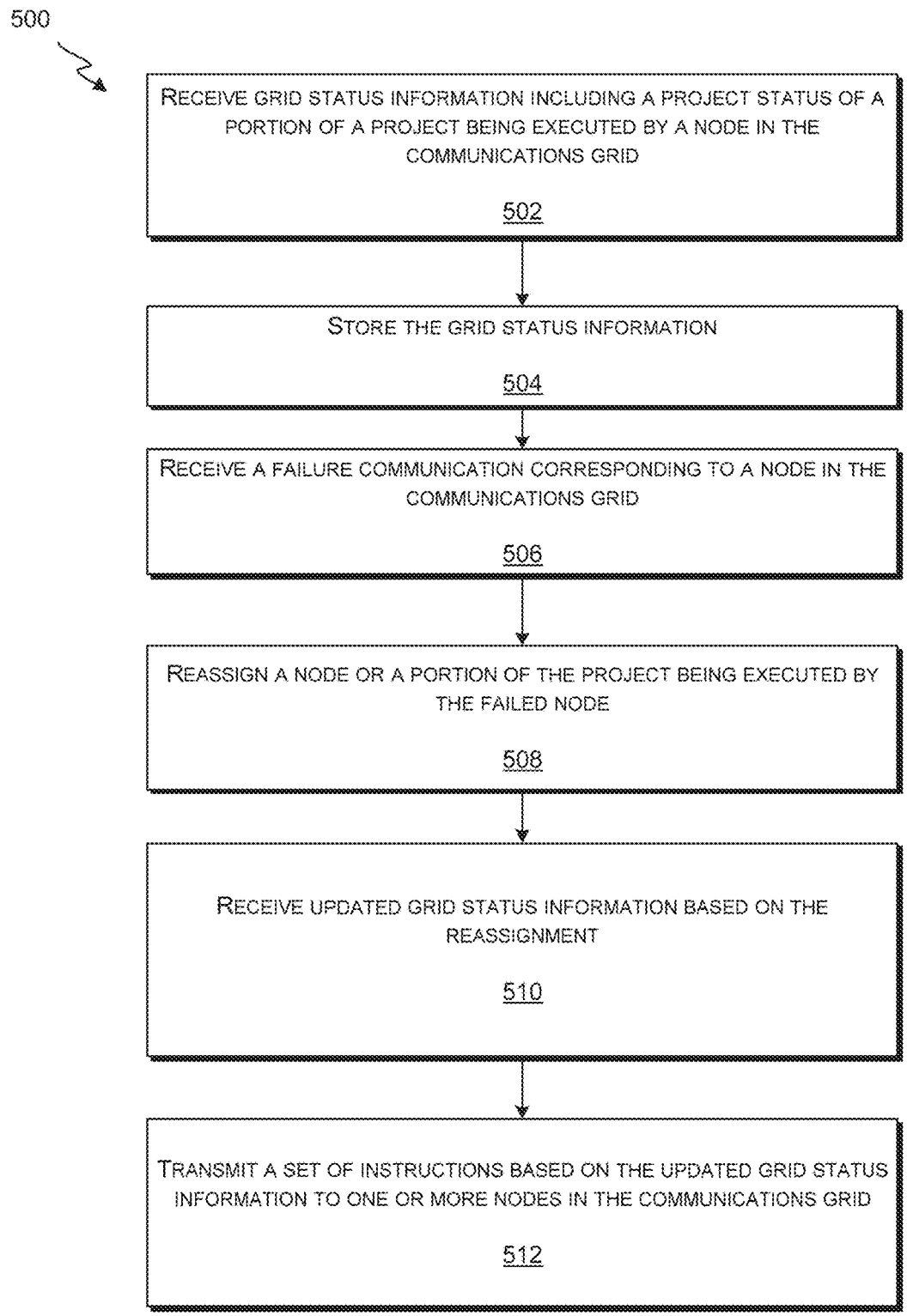
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
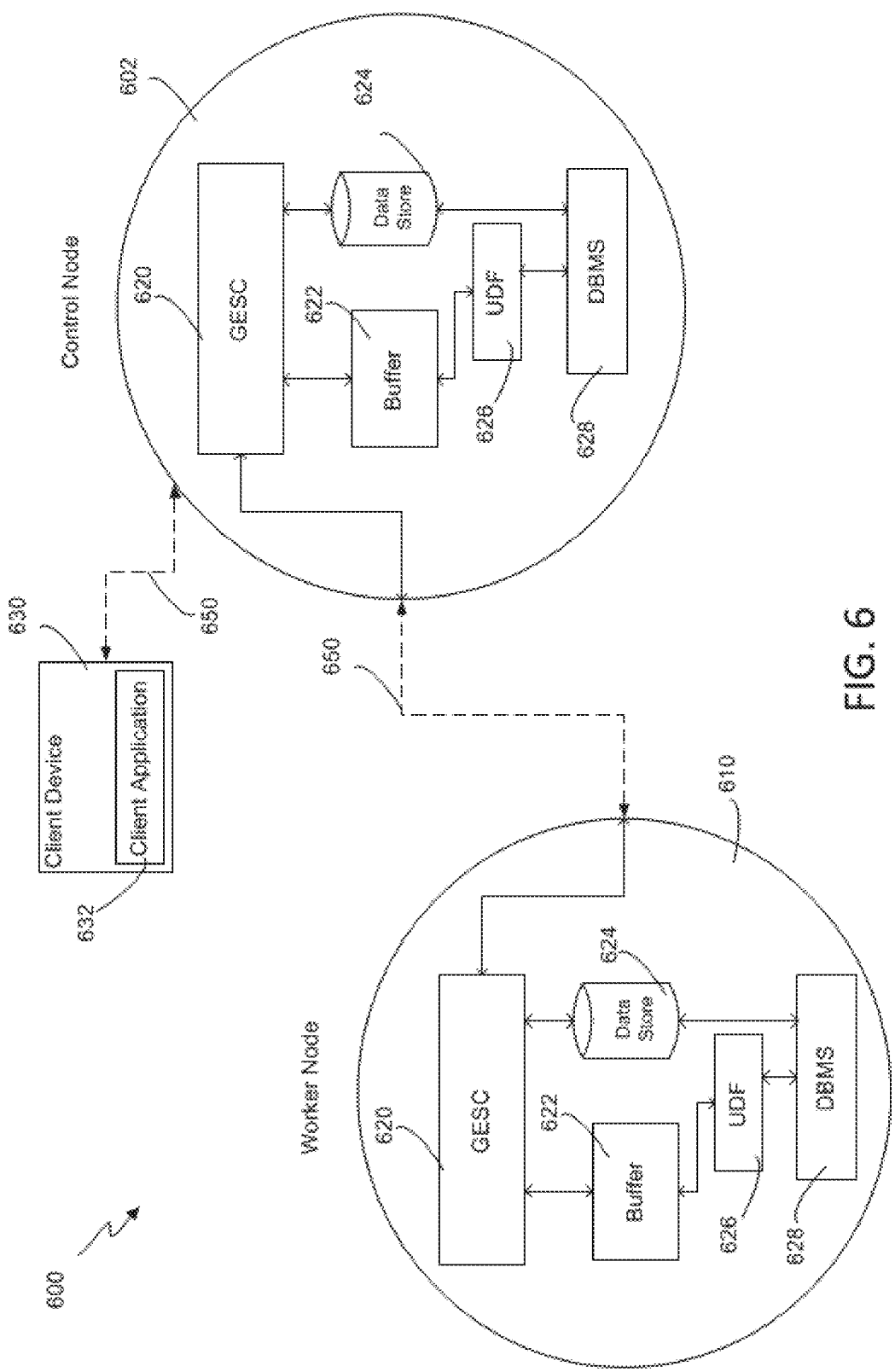
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1.

Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
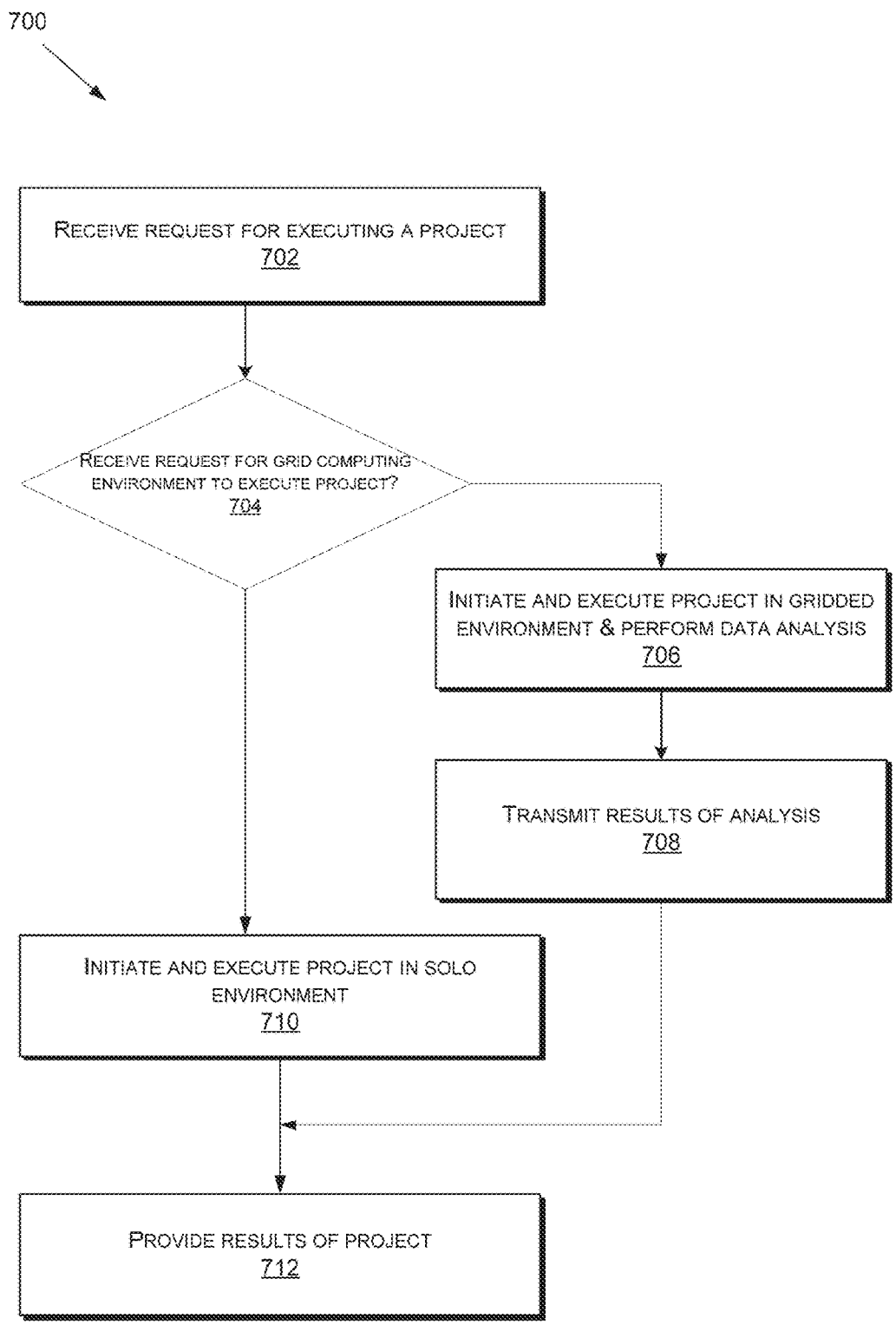
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
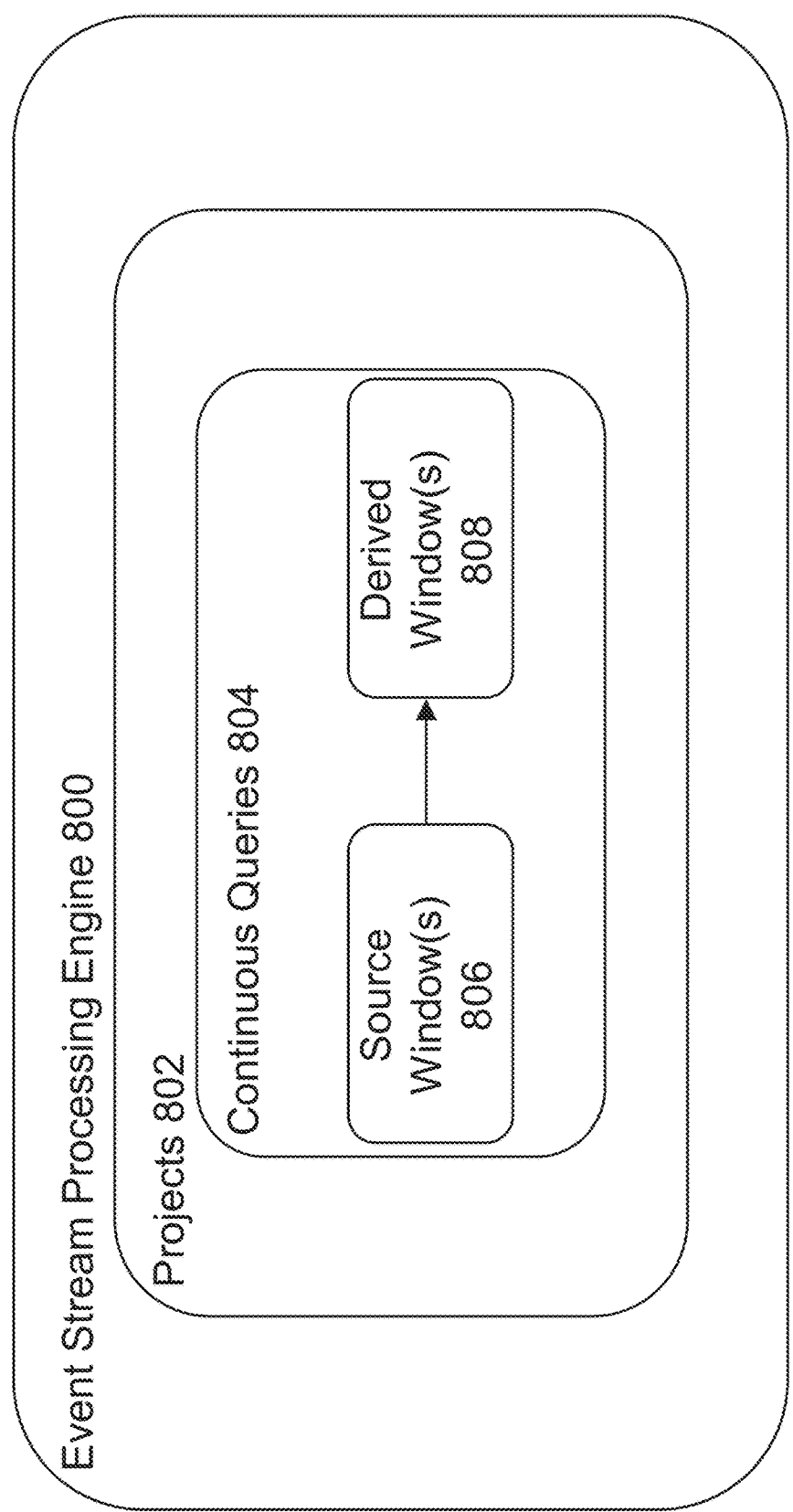
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
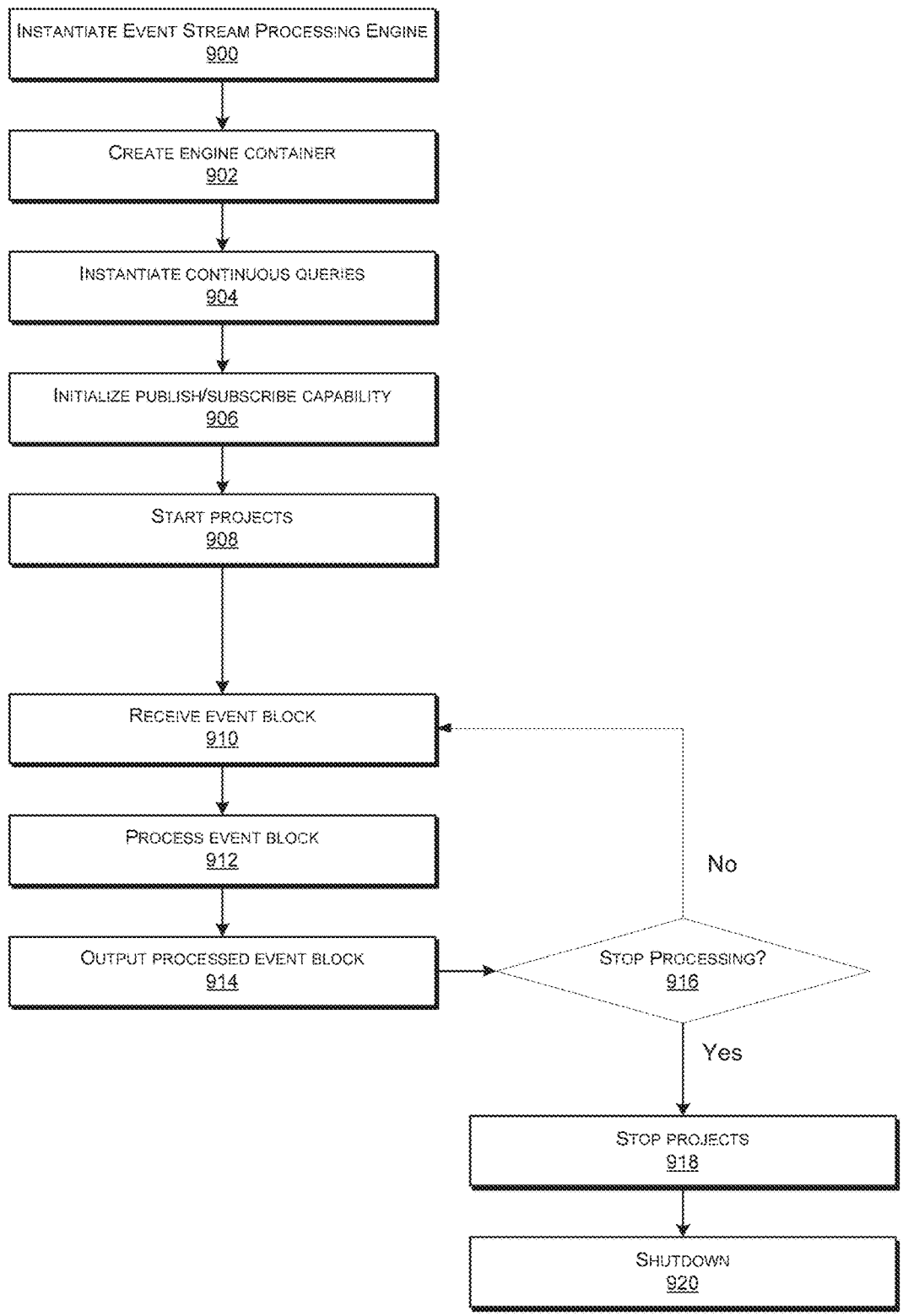
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
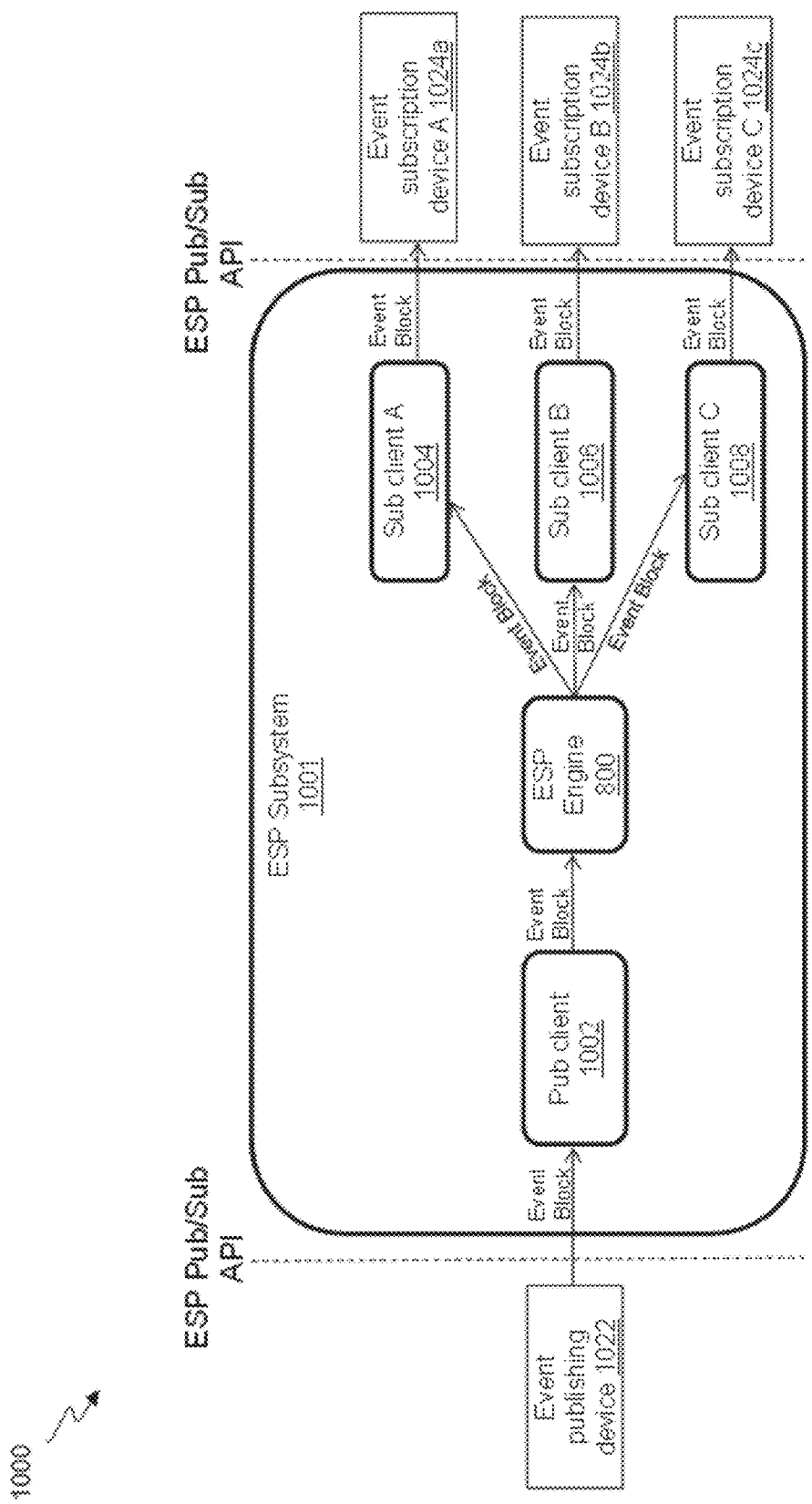
FIG. 10 is a block diagram of an ESP system interfacing between a publishing device and multiple event subscribing devices according to some aspects.

FIG. 10 is a block diagram of an ESP system 1000 interfacing between publishing device 1022 and event subscribing devices 1024a-c according to some aspects. ESP system 1000 may include ESP device or subsystem 1001, publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
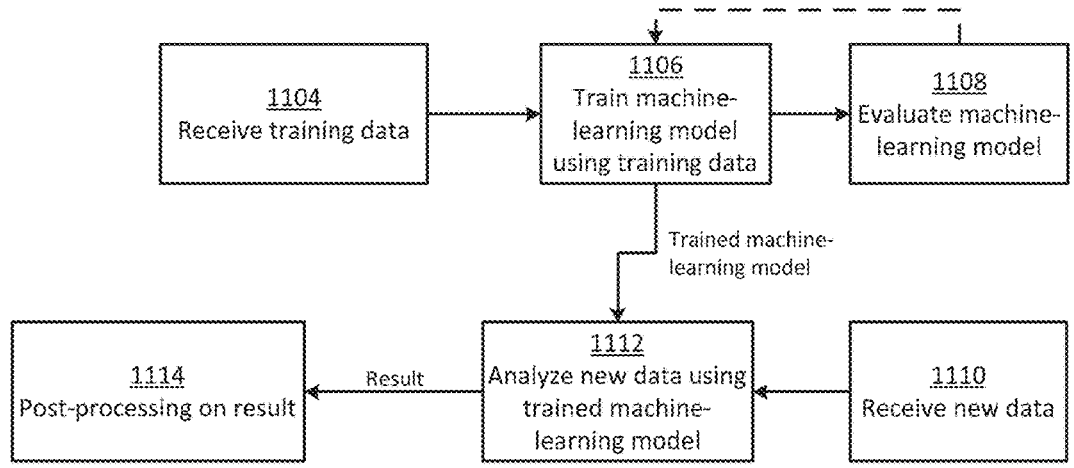
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
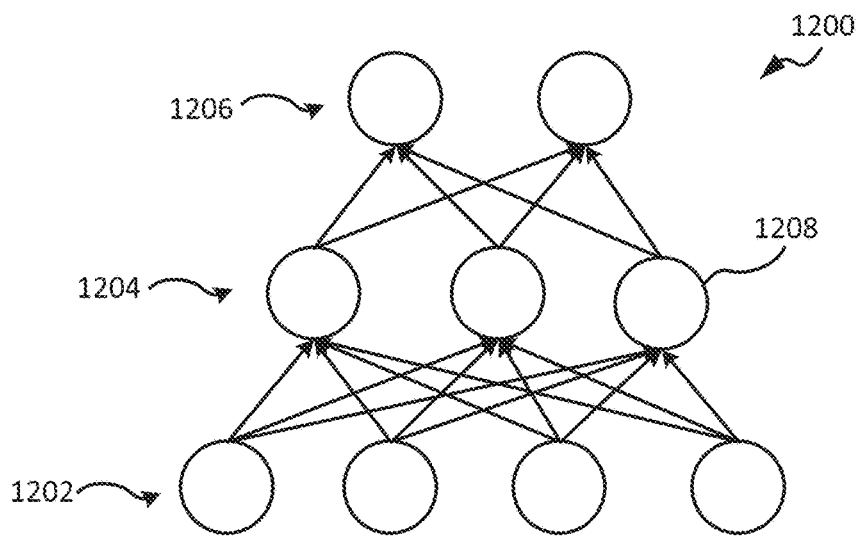
FIG. 12 is a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13:
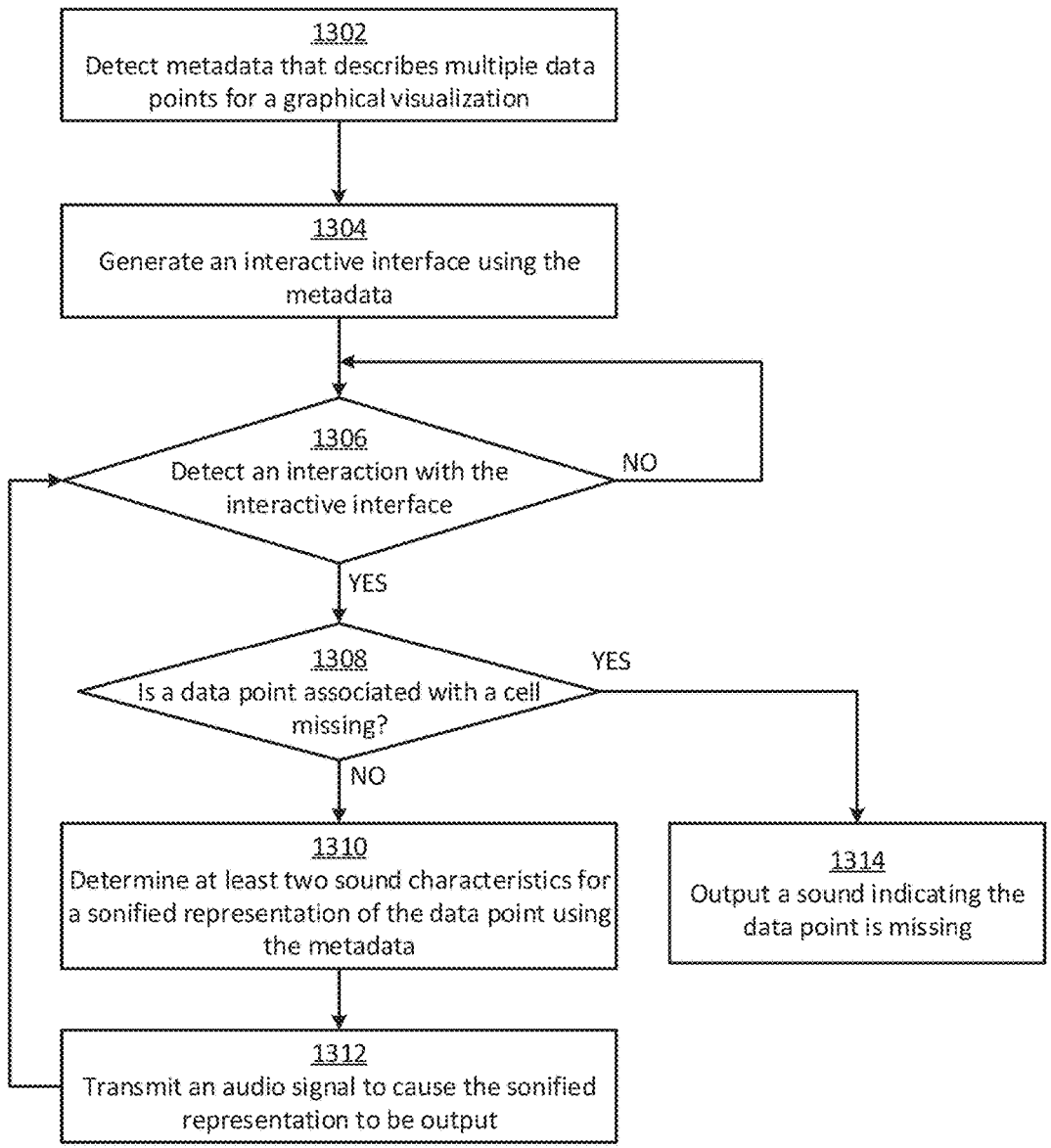
FIG. 13 is a flow chart of an example of a process for converting graphical data-visualizations into sonified output according to some aspects.

FIG. 13 is a flow chart of an example of a process for converting graphical data-visualizations into sonified output according to some aspects. Some examples can include more, fewer, or different operations than the operations depicted in FIG. 13. Also, some examples can implement the operations of the process in a different order.

In block 1302, a processing device detects metadata that describes multiple data points for a graphical visualization. Examples of the graphical visualization can include a pie chart, bar chart, line chart, series plot, bubble plot, scatter plot, histogram, high-low plot, heatmap, box plot, contour plot, band plot, regression line, confidence interval, candlestick plot, or any combination of these. The metadata may include X, Y, and Z coordinates (or values) for each data point; a type of the graphical visualization; a color coding for the graphical visualization; a title for the graphical visualization, label(s) for each axes of the graphical visualization; a coloring, styling, or font of the graphical visualization; or any combination of these. The metadata can be provided with or without the graphical visualization. The metadata can be included in a website, a physical book, a physical journal, an e-book, a Portable Document Format (PDF) document, or another medium.

In some examples, the processing device detects the presence of the metadata in a website using an extension for a website browser. For example, a user may navigate to the website using the website browser. Based on the user navigating to the website using the website browser, the extension may analyze the content of the website (e.g., the source code for the website) and detect that the content includes metadata related to a graphical visualization. As a particular example, a webpage of the website can include a graph or chart that visually represents a series of data points. The webpage can also include metadata that provides various aspects of the data points, such as the X and Y coordinates of each data point. The metadata may be wrapped within special tags (e.g., "<metadata></metadata>") in the webpage content, written in a certain programming language (e.g., eXtensible Markup Language), or otherwise be distinguishable from the other website content. The extension can analyze the webpage's content to detect the presence of the metadata and, if the metadata is detected, extract the metadata for later use. In alternative examples, the abovementioned features can be performed by the website browser itself, a plugin, or a standalone application that is independent of the website browser.

In some examples, the metadata or a reference to the metadata (e.g., a barcode or URL) can be present on a physical medium. For example, the metadata or the reference can be printed on a piece of paper (e.g., in a book) or projected onto a wall. The processing device can use a sensor to detect the metadata or the reference. For example, a piece of paper can include the graphical visualization and a textual representation of the metadata. The processing device can use a camera to take one or more pictures of the piece of paper (and the metadata on the piece of paper). The processing device can then analyze the image(s) by performing Optical Character Recognition (OCR) or another image processing technique to determine the metadata. For example, the processing device can analyze a block of text on the piece of paper for metadata tags that identify the start and end of the metadata, and extract the metadata therefrom. In another example, the piece of paper can have a barcode, such as a QR code. The processing device can use a camera to take a picture of the barcode and process the barcode to obtain the metadata (e.g., which can be directly encoded in the barcode code or obtained from a link encoded in the barcode). In still another example, the piece of paper can have a URL from which the metadata can be retrieved. The processing device can identify the URL (e.g., by analyzing camera photos) and retrieve the metadata from the URL.

Figure 14:
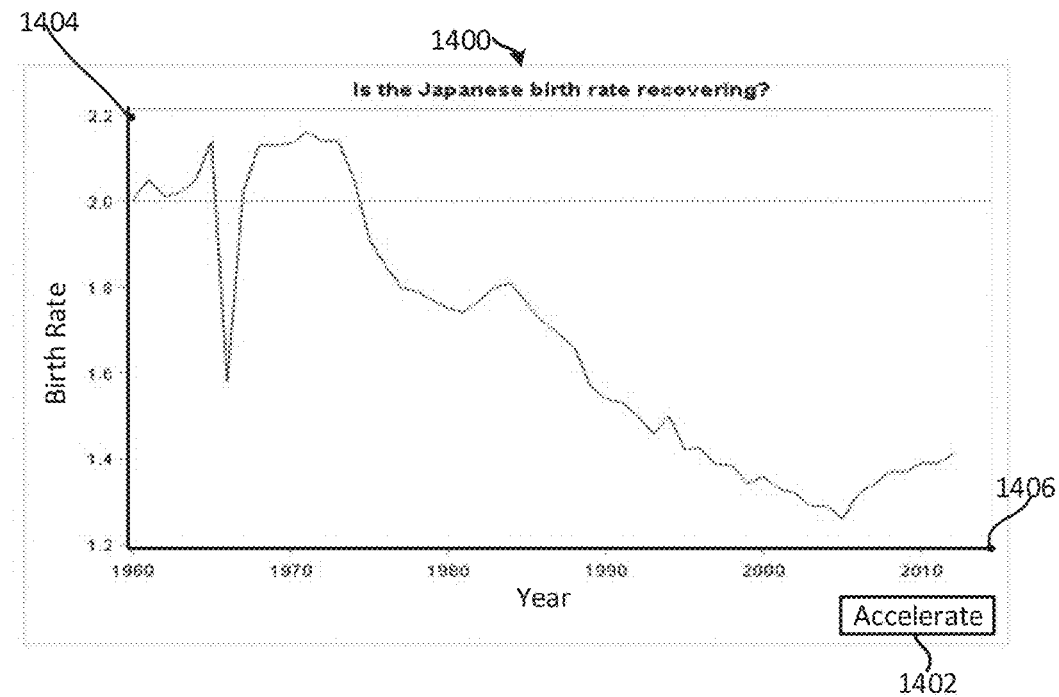
FIG. 14 is an example of a graphical visualization that is a graph according to some aspects.

In block 1304, the processing device generates an interactive interface using the metadata. The interactive interface may be different from (e.g., visually different from, separate from, etc.) the graphical visualization. For example, the graphical visualization may be a graph, such as the line graph shown in FIG. 14. The graphical visualization 1400 can be included in a website. The website can also include a graphical user interface (GUI) object 1402, such as a button, for transforming the graphical visualization into an interactive interface that is configured for visually impaired users. In some examples, the processing device may hide the graphical visualization 1400 and display an interactive interface, such as the interactive interface 1500 of FIG. 15, in response to a user interaction with the GUI object 1402. The interactive interface 1500 can be a compact, high contrast, interactive, and adjustable visual that may enable fully blind users, low vision users, users with smaller ranges of vision, or other types of visually impaired users to more easily appreciate the data expressed by the graphical visualization 1400.

The interactive interface 1500 can include various GUI objects, such as a settings button 1510 that enables a user to set a variety of settings and a help button 1512 that provides an explanation of keyboard shortcuts and other features of the interactive interface 1500. The interactive interface 1500 can also include a frame 1502 for a matrix of cells (shown by dashed lines). The frame 1502 can be drawn in high-contrast colors to provide easily identifiable boundaries for a user. The color coding and size of the frame 1502 can be adjustable via the settings button 1510.

Figure 15:
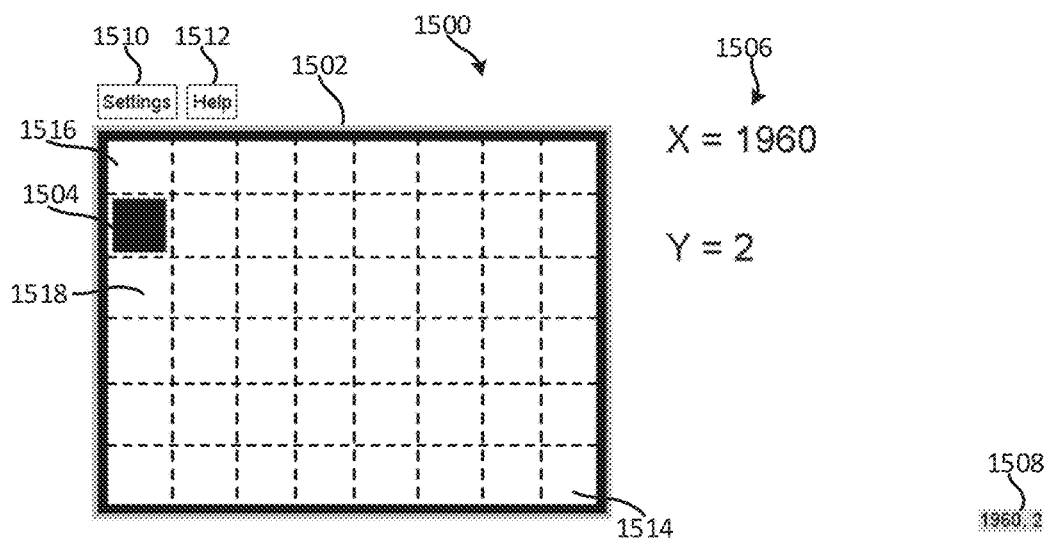
FIG. 15 is an example of an interactive interface related to the graph of FIG. 14 according to some aspects.
Figure 17:
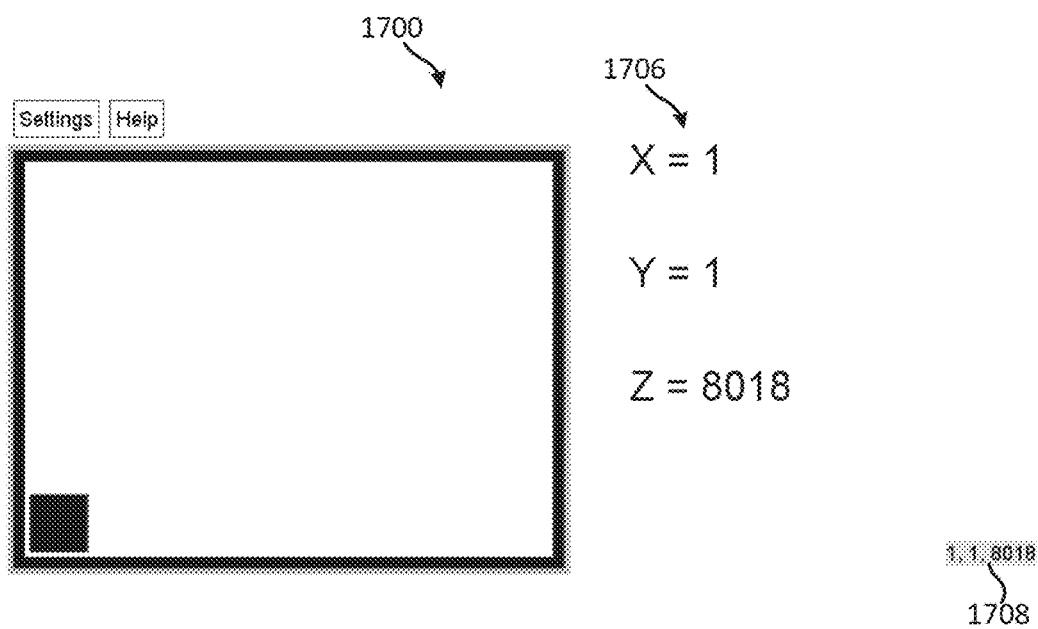
FIG. 17 is an example of an interactive interface related to the heat map of FIG. 16 according to some aspects.

As mentioned above, the interior of the frame 1502 can include a matrix of cells. In FIG. 15, the matrix of cells is shown using dashed lines for illustrative purposes. But in other examples, the cells may not have a visual border (e.g., as shown in FIG. 17). Each cell 1518 can represent one or more data points in the corresponding graphical visualization. For example, cell 1516 can represent point 1404 in the graphical visualization 1400 of FIG. 14, and cell 1514 can represent point 1406 in the graphical visualization 1400. The cells that are in-between cells 1516 and 1514 can represent the data point between points 1404 and 1406 in the graphical visualization 1400. At least some of the cells in the matrix will correspond to the data points described in the metadata (detected in block 1302).

A cursor 1504 can be included in the interactive interface 1500 to provide visual feedback indicating a cell with which the user is currently interacting. The cursor 1504 can have any suitable size and shape. In some examples, the cursor 1504 can have a high-contrast color to enhance a user's ability to interact with the interactive interface 1500. The cursor 1504 can be controlled via a user input device, such as a mouse or keyboard. For example, the user can use the right, left, up, and down arrows on a keyboard to move the cursor 1504 right, left, up, and down, respectively, in the matrix of cells. In some examples, the cursor 1504 may be unable to move beyond the square boundary defined by the frame 1502, such that the cursor 1504 is always retained within the frame 1502.

A user can move the cursor 1504 in the matrix of cells to select one or more cells. For example, a user can select a cell, hold down a particular key (e.g., a shift key), and then be able to concurrently select another cell. Alternatively, the user can select a cell while holding a particular key (e.g., a control key), which may cause one or more other cells related to the selected cell (e.g., in the same row or column as the selected cell) to also be selected. Based on the one or more cells being selected, the processing device may cause an audio device (e.g., one or more speakers) to output sounds indicating information related to the one or more cells. For example, a user may move the cursor 1504 to a particular cell. In response to the cursor 1504 being moved to the particular cell and/or the particular cell being selected, the processing device may automatically cause the audio device to output a sound to be output that auditorily represents the X value, Y value, or both of a data point corresponding to the particular cell. As another example, a user may move the cursor 1504 to a particular cell and press a play button (in the interactive interface 1500, one or more keyboard keys, etc.). In response to the particular cell being selected and the play button being pressed, the processing device may cause a sound to be output that auditorily represents the X value, Y value, or both of a data point corresponding to the particular cell. The processing device may also cause additional information to be output auditorily, such as a title of the graphical visualization related to the interactive interface 1500, labels for the X axis and Y axis, or any combination of these. This can enable a visually impaired user to auditorily explore the data that formed the original graphical visualization.

The interactive interface 1500 can additionally or alternatively include a details pane 1506. The details pane 1506 can include information about one or more data points that correspond to a currently selected cell. In this example, the details pane 1506 includes an X value and a Y value for a data point represented by the cell in which the cursor 1504 is positioned. But the details pane 1506 can include additional or alternative information, such as a Z value for a data point, a slope between two data points, a unit (e.g., cars) for each data point, a group in which the data point is a member, or any combination of these.

The interactive interface 1500 can additionally or alternatively include a closed caption area 1508. The closed caption area 1508 can visually indicate the information that is being auditorily output, as discussed above. For example, the closed caption area 1508 can display "(1960, 2)" while the words "nineteen sixty comma two" are spoken via an audio device. Providing auditory and visual modalities concurrently can enable a single user or multiple users to more easily perceive information expressed in the interactive interface 1500.

Figure 29:
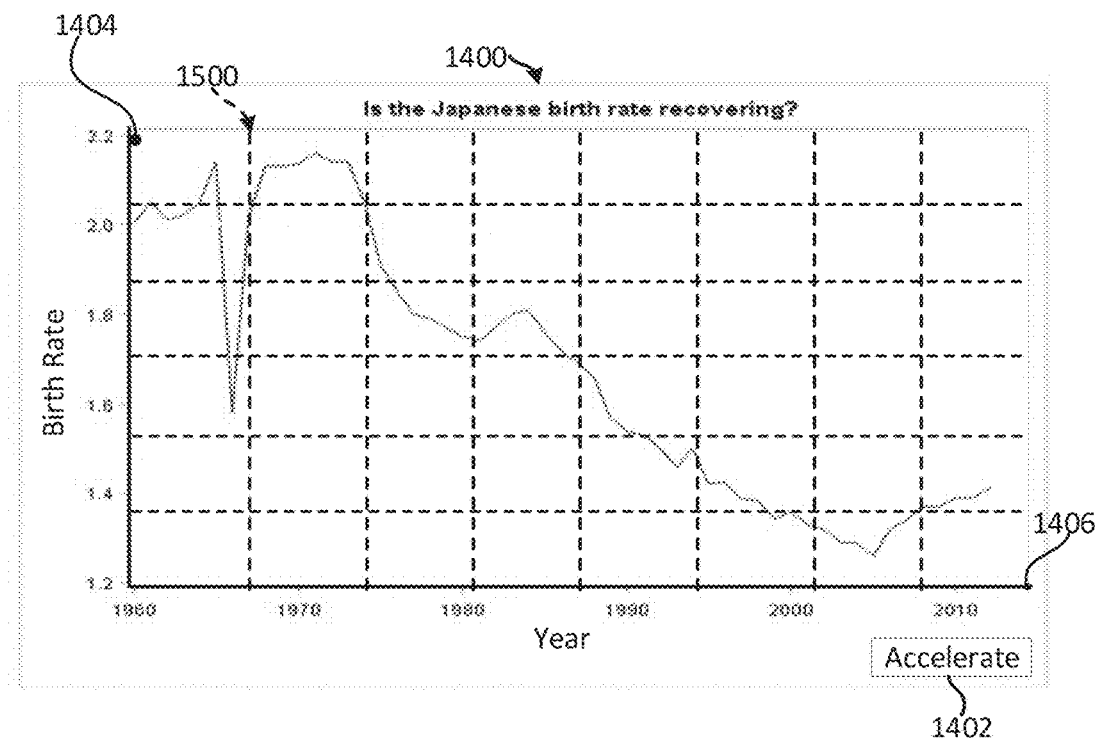
FIG. 29 is an example of a graphical visualization with an interactive interface that is transparent or hidden overlay according to some aspects.

Although the example of FIG. 15 includes an interactive interface that is a graphical display, in other examples, the interactive interface 1500 can be a transparent (e.g., hidden) overlay on the graphical visualization, for example, as shown in dashed lines in FIG. 29. In such an example, a user may interact with the various cells of the transparent overlay via a cursor or touch input. In response to an interaction with a cell, the interactive interface may output a sonified representation associated with at least one data point in the cell.

Figure 16:
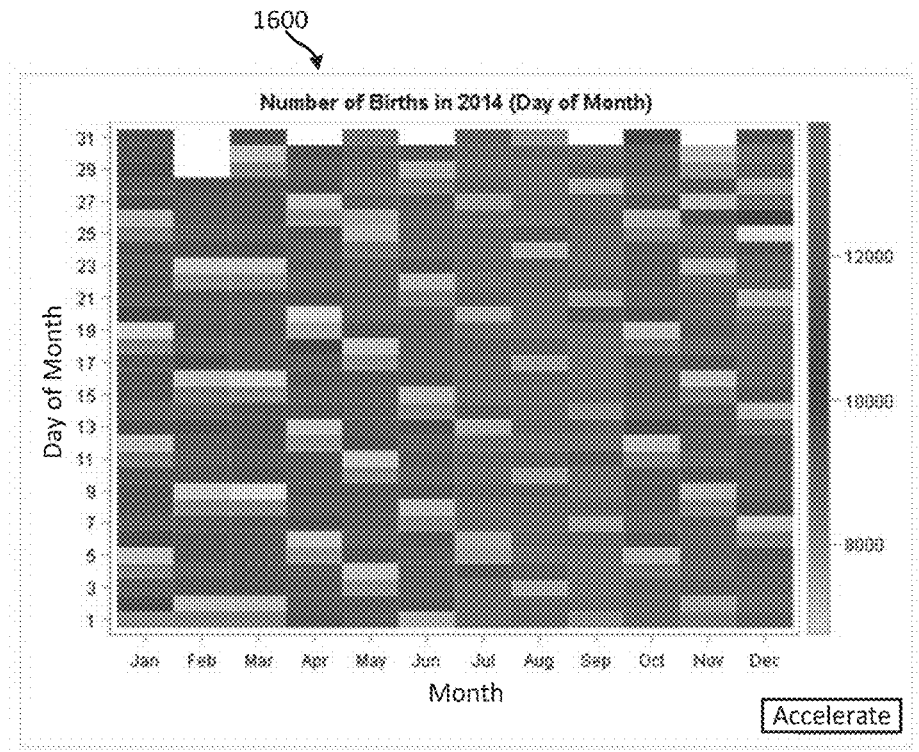
FIG. 16 is an example of a graphical visualization that is a heat map according to some aspects.

Another example of a graphical visualization and a corresponding interactive interface is shown in FIGS. 16-17. In this example, the graphical visualization 1600 is a heat map, in which each data point is expressed in three dimensions—X, Y, and Z. The X value indicates a height, the Y value indicates a day of the month, and the Z value indicates a number of births. In response to a user manipulating a GUI object (e.g., the "Accelerate" button, which can be similar to the GUI object 1402 of FIG. 14), the graphical visualization 1600 may be replaced with the interactive interface 1700 of FIG. 17. Each cell in the matrix of cells that forms the interactive interface 1700 may represent one or more cells in the heat map of FIG. 16. A user can move the cursor within the interactive interface 1700 to determine information about a particular data point, such as the Z value for the data point on January 1. As the cursor traverses through the matrix of cells, the display pane 1706 can be updated to indicate X, Y, and Z values of the data point(s) corresponding to each cell. Additionally or alternatively, one or more sounds may be output indicating the X value, Y value, Z value, or any combination of these of the data point.

Figure 18:
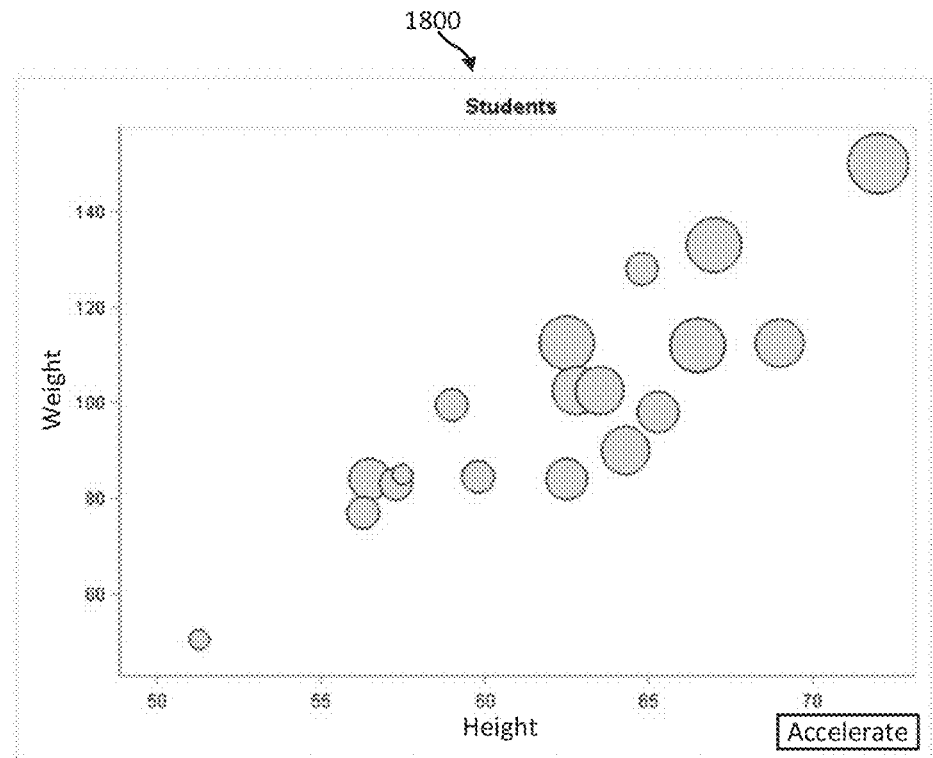
FIG. 18 is an example of a graphical visualization that is a bubble plot according to some aspects.
Figure 19:
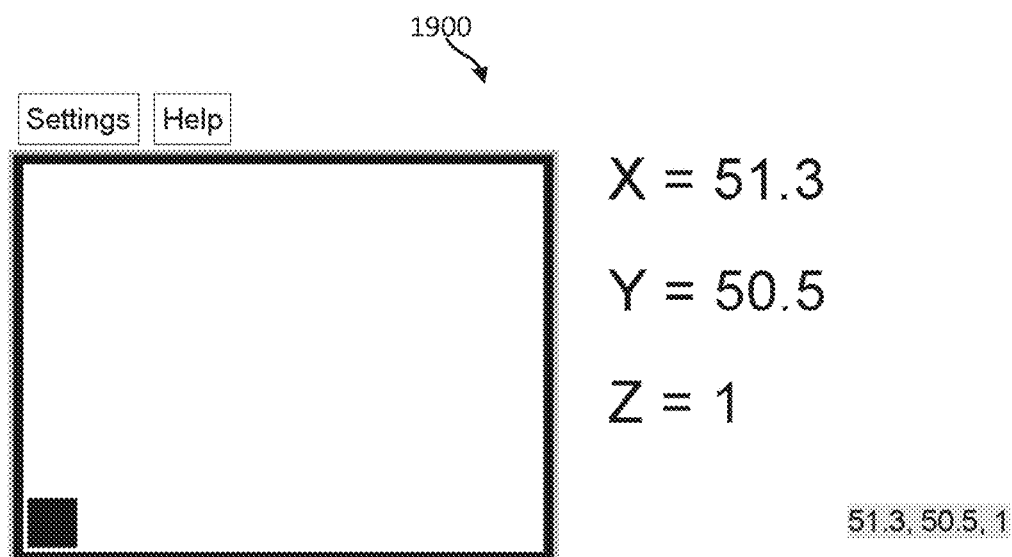
FIG. 19 is an example of an interactive interface related to the bubble plot of FIG. 18 according to some aspects.

Another example of a graphical visualization and a corresponding interactive interface is shown in FIGS. 18-19. In this example, the graphical visualization 1800 is a bubble plot, in which each circle or "bubble" is expressed in three dimensions—X, Y, and R (the radius of the circle). In response to a user manipulating the Accelerate button, the interactive interface 1900 of FIG. 19 may additionally or alternatively be generated. Each cell in the matrix of cells that forms the interactive interface 1900 may represent one or more bubbles of the bubble plot of FIG. 18. A user can move the cursor within the interactive interface 1900 to a particular cell to determine information about a bubble, such as the X- and Y-coordinate values (51.3, 50.5) of the bubble. In some examples, the "Z" value for the bubble can be determined to be (i) the number of data points in the radius R, or (ii) a maximum value within the radius R. A user may select between (i) and (ii) via the settings button or another GUI object. Visual and/or audible representations of the Z value may be output additionally or alternatively in response to the user interacting with the cell.

Figure 20:
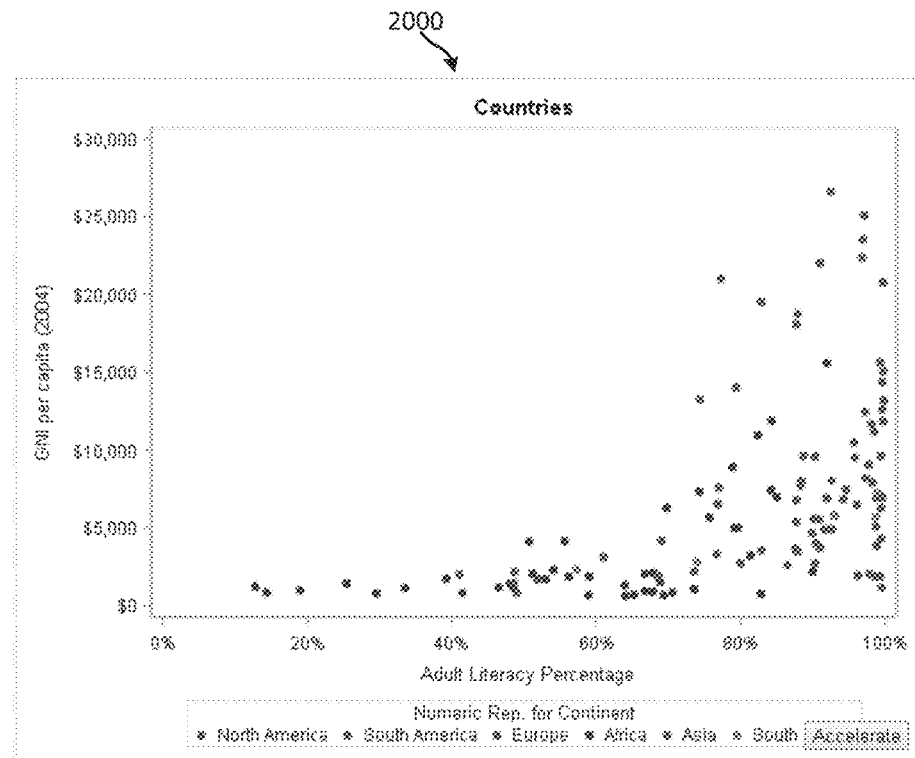
FIG. 20 is an example of a graphical visualization that is a scatter plot according to some aspects.
Figure 21:
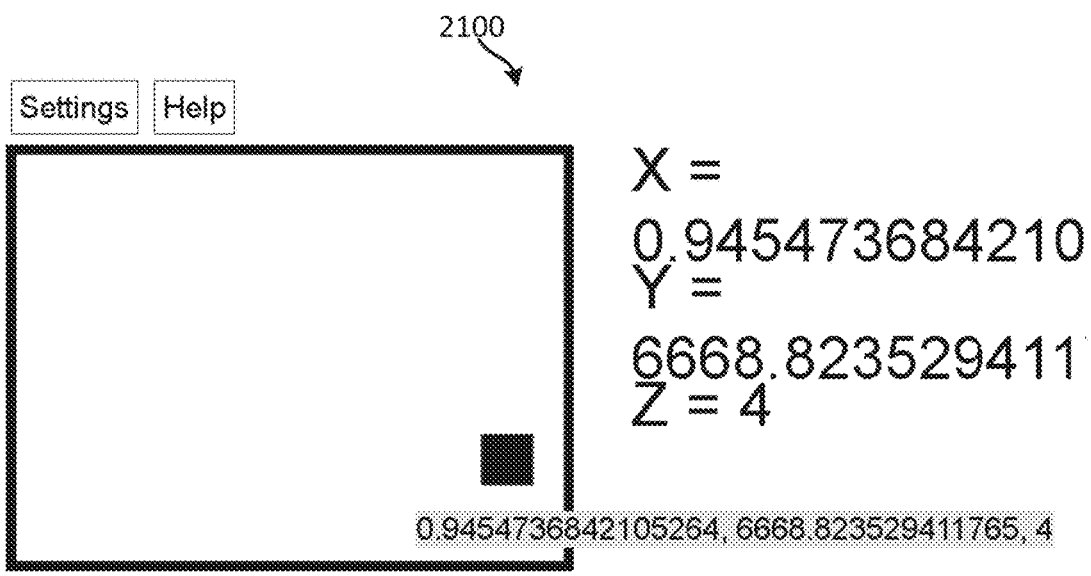
FIG. 21 is an example of an interactive interface related to the scatter plot of FIG. 20 according to some aspects.

Another example of a graphical visualization and a corresponding interactive interface is shown in FIGS. 20-21. In this example, the graphical visualization 2000 is a scatter plot, in which each data point is expressed in three dimensions—X, Y, and a color. In some examples, the interactive interface 2100 of FIG. 21 may additionally or alternatively be generated. Each cell in the matrix of cells that forms the interactive interface 2100 may represent one or more coordinates in the scatter plot of FIG. 21. For example, the lower-left coordinate in the scatter plot may be correlated to the lower-left cell in the matrix of cells. And the upper-right coordinate in the scatter plot may be correlated to the upper-right cell in the matrix of cells. In some examples, the number of cells forming the matrix will be less than the number of coordinates in the graphical visualization 2000. For example, there may only be 25 cells in the matrix, but there may be 100 possible data points in the graphical visualization 2000. So, the processing device may express the multiple data points as a single cell in the matrix of cells. And information collectively describing the multiple data points can be determined and output in response to an interaction with the single cell. For example, several data points can be represented as a single cell in the matrix of cells. In such an example, the X, Y, and Z values for the data points can be averaged together, with the average X, Y, and Z values being the assigned output for the single cell. In such an example, the average X, Y, and Z values can be output in the display pane, the closed caption area, and/or auditorily in response to an interaction with that cell. In other examples, other types of information about the several data points can be output, such as (i) a frequency in which the data points occur in a given area, (ii) a mode of the data points, (iii) a median value of the data points, (iv) a minimum value of the data points, (v) a standard deviation of the data points, (vi) a sum of the data points, or (vii) any combination of these. A user may be able to customize how data points are grouped or otherwise represented in the matrix of cells via the settings button 1510 or another means. Additionally or alternatively, a user may be able to customize what type(s) of information to output about data points via the settings button 1510 or another means.

Figure 22:
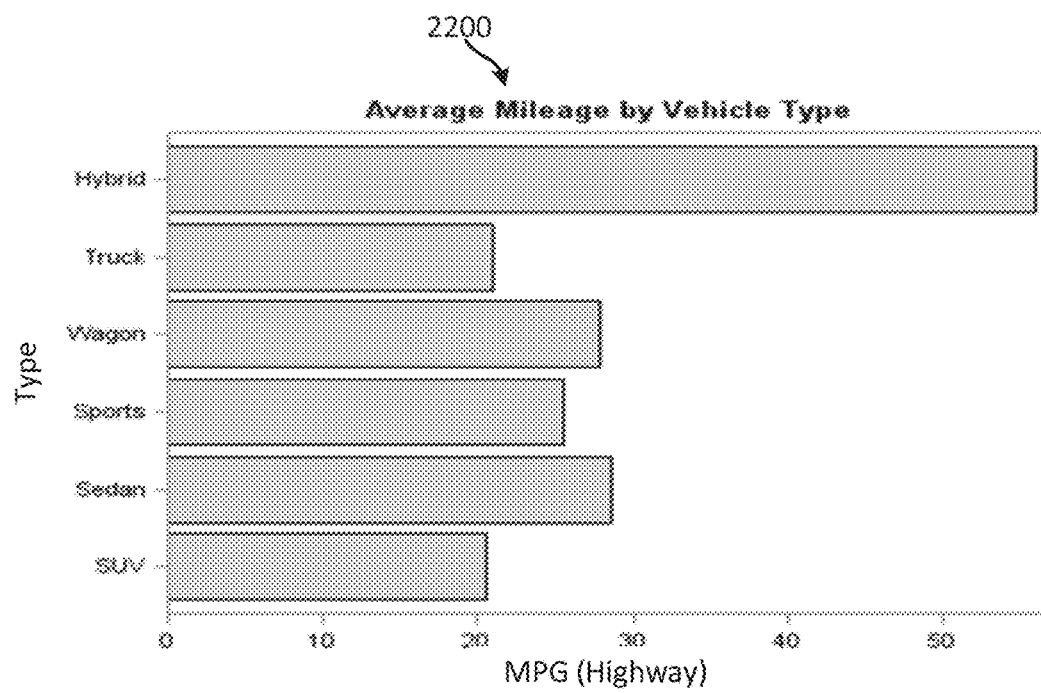
FIG. 22 is an example of a graphical visualization that is a bar chart according to some aspects.
Figure 23:
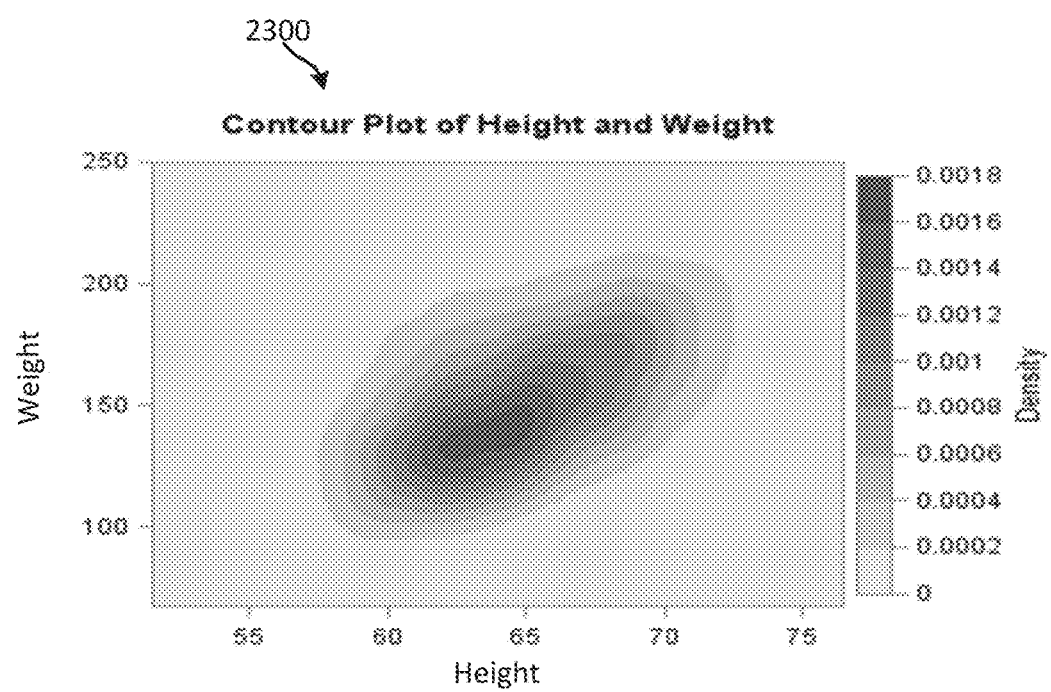
FIG. 23 is an example of a graphical visualization that is a contour plot according to some aspects.
Figure 24:
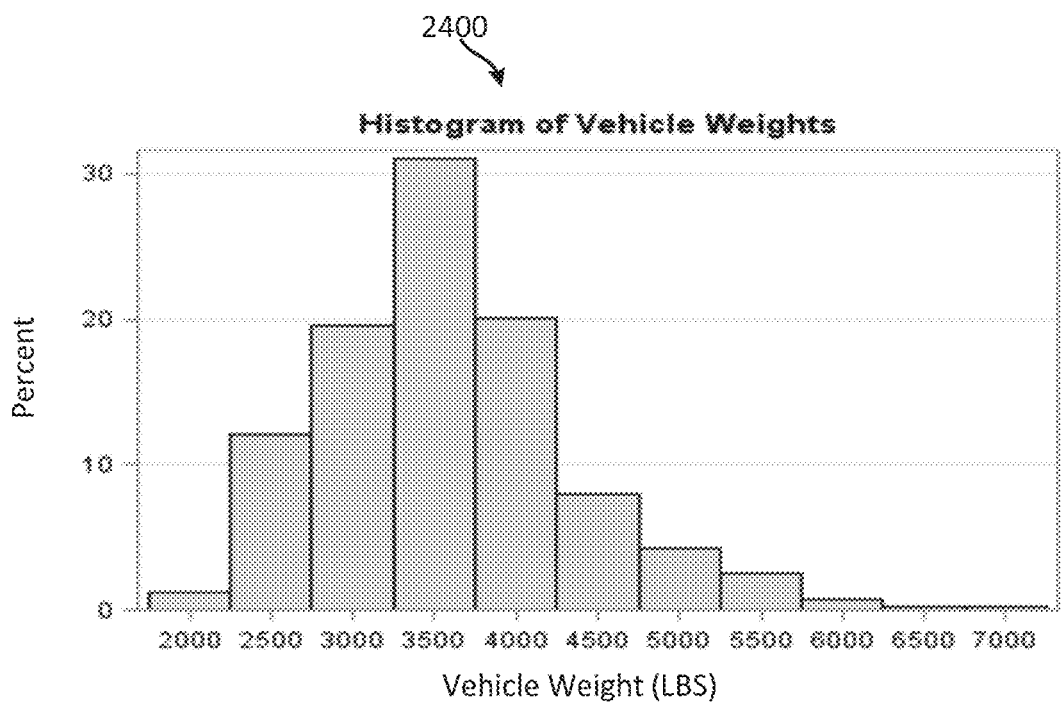
FIG. 24 is an example of a graphical visualization that is a histogram according to some aspects.
Figure 25:
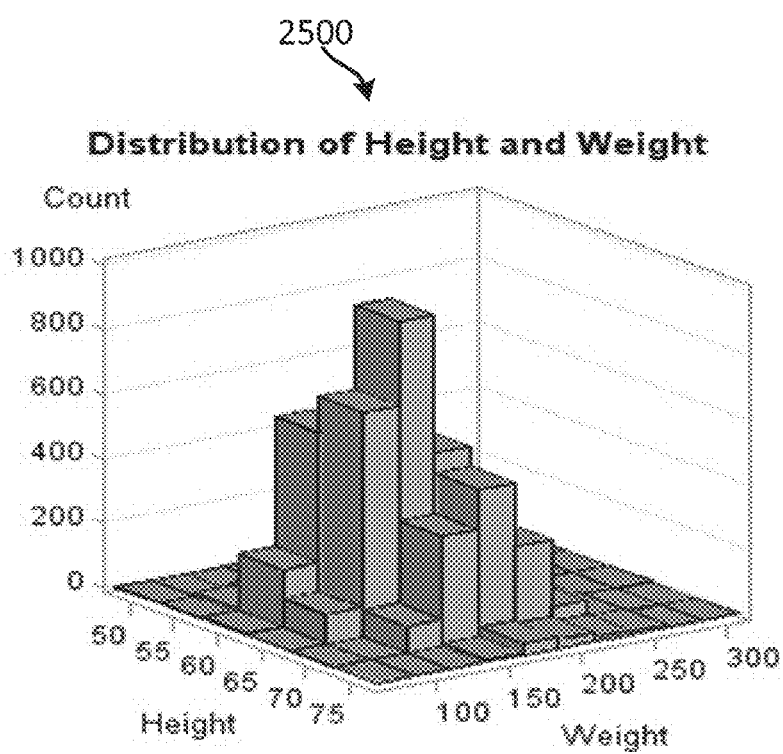
FIG. 25 is an example of a graphical visualization that is a bivariate histogram according to some aspects.
Figure 26:
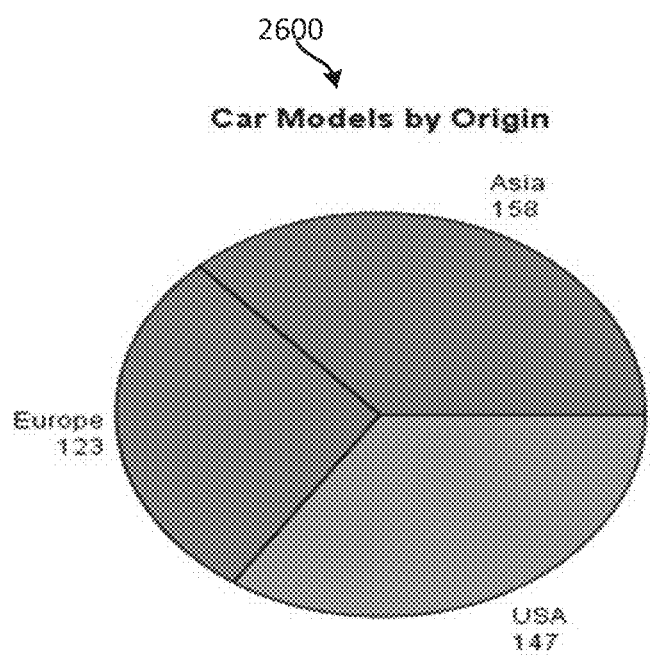
FIG. 26 is an example of a graphical visualization that is a pie chart according to some aspects.
Figure 27:
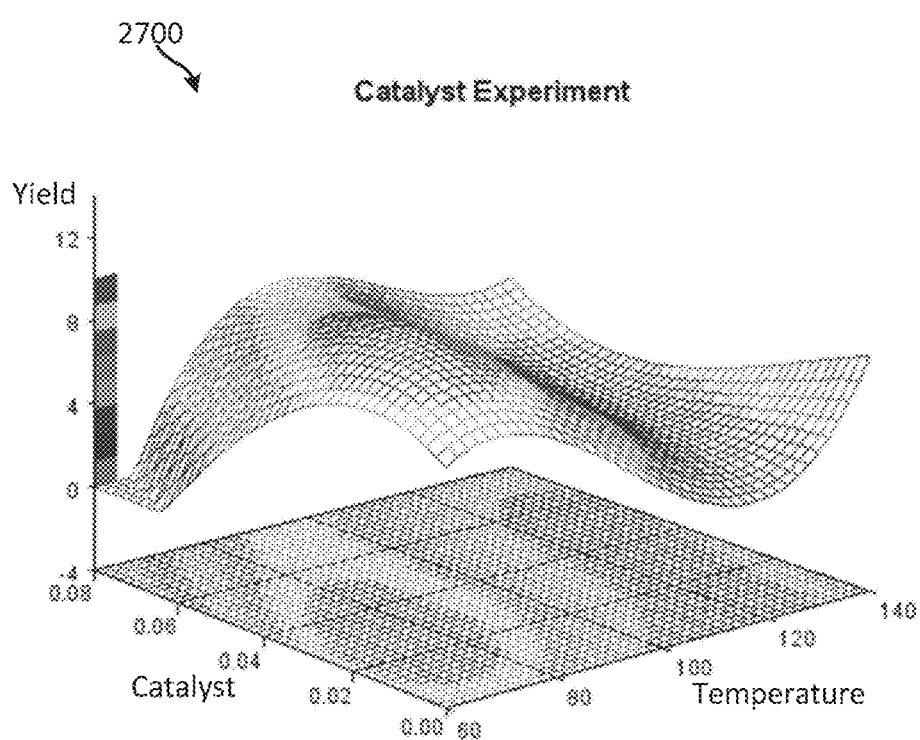
FIG. 27 is an example of a graphical visualization that is a surface plot according to some aspects.

Other examples of graphical visualizations are shown in FIGS. 22-27. FIG. 22 depicts an example of a bar graph. FIG. 23 depicts an example of a contour plot 2300. FIG. 24 depicts an example of a histogram 2400. FIG. 25 depicts an example of a bivariate histogram 2500. FIG. 26 depicts a pie chart. And FIG. 27 depicts an example of a surface plot 2700. Metadata associated with these graphical visualizations can be analyzed to generate an interactive interface (e.g., of the type discussed above) that is more easily perceivable by a visually impaired user. And most of these graphical visualizations are generated using data points with least two coordinate values (e.g., an X value and a Y value). Some of these graphical visualizations also have a third coordinate value, such as a Z value or a second Y value (for a second Y axis). Any number and combination of the techniques described herein can be used to convert the coordinates for the data points into sonified representations that are more easily perceivable by the visually impaired.

Returning to FIG. 13, in block 1306 the processing device detects an interaction with the interactive interface. Some examples of the interaction can include selecting, hovering over, contacting, or gesturing on a cell in the matrix of cells. For example, the processing device can detect the cursor in the interactive interface being moved to the cell (or traversing past the cell). In another example, the processing device can detect a selection of the cell via a mouse or keyboard. In another example, the processing device can detect a user hovering a finger over the cell via a capacitive touch-screen display. In another example, the processing device can detect a user contacting the cell or performing a gesture on the cell via a touch-screen display. In other examples, the interaction can include a voice command associated with the cell. For example, the processing device can receive the voice command "play cell 3, 1" via an audio input device, process the voice command, and output a sonified representation of a data point associated with the cell in the third row and first column of the matrix.

If the processing device detects the interaction with the cell, the process can proceed to block 1308. Otherwise, the process can return to block 1306 and await the interaction.

In block 1308, the processing device determines if a data point associated with the cell is missing. For example, the interaction may be with cell 1514 of FIG. 15. And while cell 1514 may correspond to the lower-right side of the graphical visualization 1400, there may be no data point at that location. So, the processing device may determine that the data point corresponding to cell 1514 is missing (e.g., null or empty). In other examples, the processing device determines if a specific value for a data point associated with the cell is missing. For example, the interaction may be with cell 1514 of FIG. 15, for which there may be a corresponding data point with an X coordinate and a Y coordinate. But the data point may not have a Z coordinate. So, the Z coordinate corresponding to cell 1514 may be missing (e.g., null or empty). If the data point for is entirely missing, or a specific value (e.g., the Z-coordinate value) for the data point is missing, the data point can be referred to as a missing data point and the related cell can be referred to as a missing cell.

If the processing device determines that the data point is a missing data point, the process can process to block 1314, where the processing device can cause a sound to be output. The sound can indicate that the data point is a missing data point. An example of the sound can include knocking sound. This may be a sufficiently different sound from the other sounds used to express information to be distinguishable and meaningful to a user. In other examples, if the processing device determines that the data point is a missing data point, the processing device may not cause a sound to be output. The absence of the sound may indicate to a user that the data point is missing.

If the processing device determines that the data point is not missing (e.g., exists and has all required values), the processing device can determine at least two sound characteristics for a sonified representation of the data point using the metadata. Each of the at least two sound characteristic can audibly represent a different aspect of the data point. Examples of a sound characteristic can include an amplitude, frequency, duration, waveform, pitch, pan setting, or any combination of these. In some examples, the sonified representation of the data point can be a single note, non-speech audio, or both, which can be generated according to the at least two sound characteristics.

As one example, the processing device can determine an X coordinate and a Y coordinate for the data point using the metadata. The processing device can determine a pan setting that represents the X coordinate and pitch that represents the Y coordinate. The pan setting can be the amount of pan between two speakers that form an audio device through which the sonified representation of the data point is to be output. In some examples, a lower X-coordinate value can be panned more to a left speaker and a higher X-coordinate value can be panned more to a right speaker (e.g., because lower X-coordinate values may be represented by cells toward the left side of the matrix of cells and higher X-coordinate values may be represented by cells toward the right side of the matrix of cells). In one specific example, the lowest X-coordinate value among all the data points and the highest X-coordinate value among all the data points can be used for normalization, with the pan setting being all the way to the left for the lowest X-coordinate value, all the way to the right for the highest X-coordinate value. Interpolation can then be used to determine the appropriate pan setting for an X-coordinate value that falls between the lowest and highest X-coordinate values. Additionally or alternatively, a lower Y-coordinate value can represented with a lower pitch and a higher Y-coordinate value can be represented with a higher pitch. In one specific example, the lowest Y-coordinate value among all the data points and the highest Y-coordinate value among all the data points can be used for normalization, with the pitch being a first frequency for the lowest Y-coordinate value and a second frequency for the highest Y-coordinate value, where the second frequency is higher than the first frequency. Interpolation can then be used to determine the appropriate pitch for a Y-coordinate value that falls between the lowest and highest Y-coordinate values. The processing device can use any number and combination of techniques to determine any number and combination of sound characteristics.

In another example, the processing device can access a lookup table that correlates X values, Y values, Z values, or any combination of these, to certain sound characteristics. For example, the processing device can access a lookup table that correlates a coordinate value to a certain sound bite, sound type, waveform, sound pattern, amplitude, pan setting, or any combination of these. The processing device can use the lookup table to map a coordinate to the corresponding sound characteristic.

In yet another example, the processing device can input an X value, Y value, Z value, or any combination of these, into an algorithm to determine a sound characteristic. For example, the processing device can determine a sound characteristic that is representative of a coordinate value by using an algorithmic relationship (e.g., a proportional relationship) between the coordinate value and a pan setting, amplitude, or frequency.

In some examples, the processing device can determine additional sound characteristics based on the metadata. An example of an additional sounds characteristic can be a third sound characteristic that audibly indicates a Z coordinate of the data point. In one example, the third sound characteristic can be an entirely separate sound, such as wind or "woosh" sound that is distinct from the other sounds being played. This can reduce "pitch collision," in which the pitch of sound representing the Z-coordinate is similar to the pitch of the sound representing the Y-coordinate. This separate sound indicating the Z coordinate can be output at the same time as the sound(s) representing the X and Y coordinates of the data point.

In block 1312, the processing device transmits an audio signal to an audio device, whereby the audio signal is configured to cause the sonified representation of the data point to be output. This can cause the audio device to output the sonified representation having the at least two sound characteristics. For example, the audio signal may be a waveform (or combination of waveforms) that the processing device can transmit to the audio device to cause the audio device to output a sound having the at least two sound characteristics. A user may perceive the at least two sound characteristics and be able to determine therefrom, for example, the X coordinate and Y coordinate for the data point.

In one particular example, the sonified representation of the data point can include a piano note that is panned to indicate an X coordinate of the data point and that has a pitch indicating a Y coordinate of the data point. Other types of audio notes or instruments can additionally or alternatively be used to express information about a data point.

Figure 28:
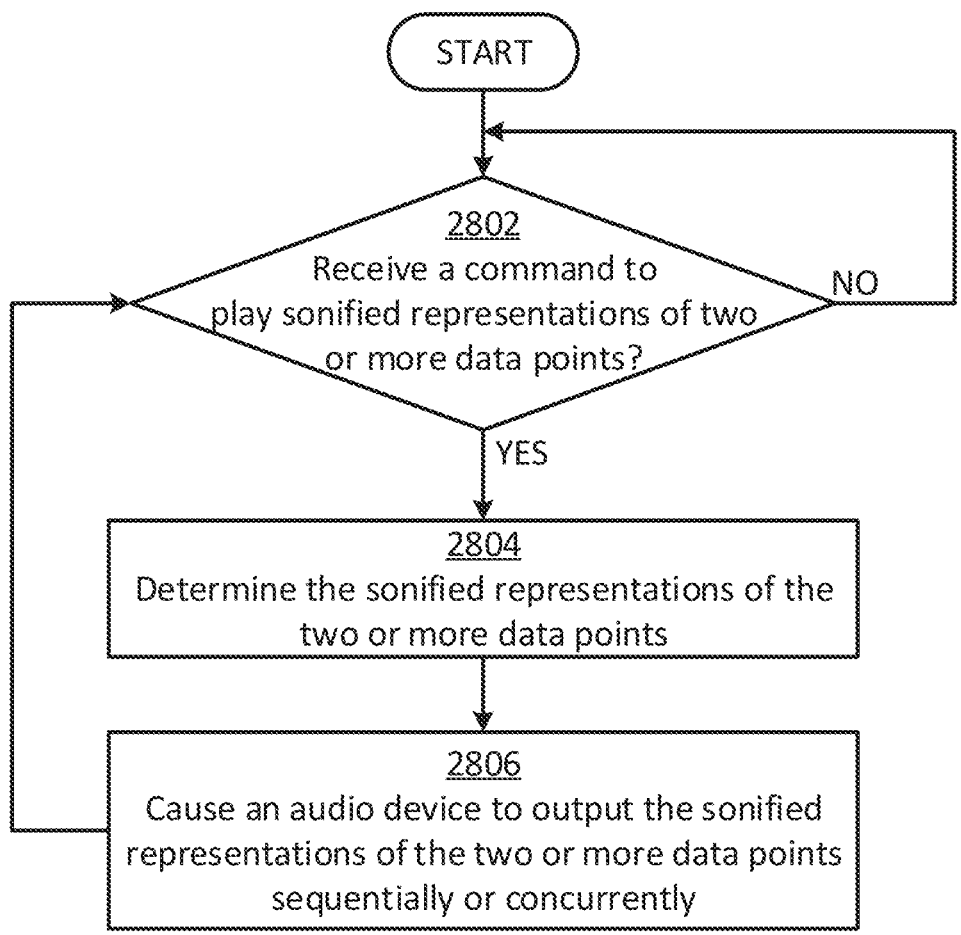
FIG. 28 is a flow chart of an example of a process for converting graphical data-visualizations into sonified output according to some aspects.

Other user interactions with the interactive interface are also possible. Some of these user interactions are described below with respect to FIG. 28. Other examples can include more, fewer, or different operations than the operations depicted in FIG. 28. Also, some examples can implement the operations of the process in a different order.

In block 2802, a processing device determines if a command to play sonified representations of two or more data points has been received. The processing device can receive the command via a user input device, such as a mouse, keyboard, or microphone. For example, the user can press a keyboard shortcut for playing sonified representations of the two or more data points. Alternatively, the processing device can receive the command from another computing device (e.g., a remote computing device that communicates the command via a network). Alternatively, the processing device can receive the command as a voice command from a microphone.

In some examples, the command may be for outputting sonified representations of every data point associated with the matrix of cells. This can provide the user with an auditory equivalent of "glance exposure," in which sighted users can quickly visually assess a graphical visualization to determine basic information about the visualization, such as if the data points have a downwards trend. In other examples, the command may be for outputting sonified representations of every data point associated with a particular row or a particular column of the matrix of cells. This can be a more tailored equivalent to glance exposure. The command can be for outputting any number and combination of sonified representations of any number and combination of data points associated with the matrix of cells.

If the processing device determines that the command has been received, the process can continue to block 2804. Otherwise, the process can return to block 2802, where the processing device can await the command.

In block 2804, the processing device determines the sonified representations of the two or more data points. The processing device can perform some or all of the operations discussed with respect to block 1310 of FIG. 13 to determine a respective sonified representation for each data point. Each sonified representation may have one or more sound characteristics configured to express information about a corresponding data point.

In block 2806, the processing device causes an audio device to output the sonified representations of the two or more data points sequentially or concurrently. In some examples, the sonified representations can be output sequentially if an audio-output parameter is set to a melody setting, or the sonified representations can be output concurrently if the audio-output parameter is set to a chord setting. A user may be able to switch between the melody and chord settings using, for example, the settings button 1510 in FIG. 15, a keyboard shortcut, or a voice command. For example, if the audio-output parameter is set to the melody setting, the processing device may cause sonified representations of every data point associated with the matrix of cells to be sequentially output with a 10 millisecond (ms) delay between each sonified representation. This may enable users to quickly understand important information about the data points, such as a general trend of the data points. A user may be able to control the delay between each sonified representation via a settings button or keyboard shortcut.

As another example, if the audio-output parameter is set to the chord setting, the processing device may cause sonified representations of every data point associated with the matrix of cells to be output at the same time. This may also enable the user to decipher important information about the data points. For example, if the overall pitch of the sonified representations is generally lower frequency, this may indicate to the user that the data points generally have a lower Y-coordinate value. In some examples, sonified representations of missing data points may not be output in the chord setting. This may prevent confusion. In some examples, if every cell in a row or column of the matrix of cells is a missing cell, a panned missing-value sound can be played. This can rapidly give the user a sense of how much data is in the row or column, and where the data is located (e.g., the spatial distribution of the data).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
a memory device on which instructions executable by the processing device are stored for causing the processing device to:
receive metadata that describes a plurality of data points for a chart;
display the chart and an input element associated with the chart within a graphical user interface (GUI);
detect an interaction with the input element;
in response to detecting the interaction with the input element:
visually remove the chart so that the chart is no longer visible within the GUI; and
generate an interactive interface within the GUI using the metadata, wherein the interactive interface is different from the chart, and wherein the interactive interface includes a matrix of cells, each cell in the matrix corresponding to a respective data point among the plurality of data points described by the metadata;
detect an interaction with a cell in the matrix, the interaction indicating that a sonified representation of a data point corresponding to the cell is to be output; and
based on detecting the interaction:
determine at least two sound characteristics for the sonified representation of the data point using a portion of the metadata describing the data point, the at least two sound characteristics each audibly representing a different aspect of the data point; and
transmit an audio signal to an audio device, the audio signal being configured to cause the audio device to output the sonified representation having the at least two sound characteristics.

2. The system of claim 1, wherein:
the at least two sound characteristics comprise a first sound characteristic and a second sound characteristic;
the first sound characteristic comprises a pan setting for panning the sonified representation of the data point between at least two speakers included in the audio device; and
the second sound characteristic comprises a pitch of the sonified representation.

3. The system of claim 2, wherein:
the data point includes an X coordinate and a Y coordinate; and
wherein the memory device further comprises instructions executable by the processing device for causing the processing device to determine the first sound characteristic and the second sound characteristic such that the pan setting represents the X coordinate of the data point and the pitch represents the Y coordinate of the data point.

4. The system of claim 3, wherein:
the data point further includes a Z coordinate;
the at least two sound characteristics includes a third sound characteristic that audibly represents the Z coordinate; and
the memory device further comprises instructions executable by the processing device for causing the processing device to determine the third sound characteristic.

5. The system of claim 2, wherein the sonified representation is a single audio note having the pan setting and the pitch.

6. The system of claim 1, wherein the memory device further comprises instructions executable by the processing device for causing the processing device to:
receive a command indicating that another sonified representation of another data point among the plurality of data points is to be output;
determine that the other data point has a value that is missing using another portion of the metadata describing the other data point; and
based on receiving the command and determining that the value is missing, cause the audio device to output a sound indicating that the value is missing.

7. The system of claim 1, wherein the memory device further comprises instructions executable by the processing device for causing the processing device to:
receive a command indicating that sonified representations of two or more data points among the plurality of data points are to be played in a sequential order within a user-defined timespan;
determine the sonified representations of the two or more data points; and
based on receiving the command, cause the audio device to output the sonified representations of the two or more data points in the sequential order within the user-defined timespan.

8. The system of claim 1, wherein the memory device further comprises instructions executable by the processing device for causing the processing device to:
determine that an audio-output parameter is set to a chord setting; and
based on detecting the interaction and determining that the audio-output parameter is set to the chord setting:
determine a row or a column in the matrix that includes the cell; and
cause the audio device to concurrently output sonified representations of two or more data points that are represented by multiple cells in the row or the column.

9. The system of claim 1, wherein the memory device further comprises instructions executable by the processing device for causing the processing device to:
determine that an audio-output parameter is set to a melody setting; and
based on detecting the interaction and determining that the audio-output parameter is set to the melody setting:
determine a row or a column in the matrix that includes the cell; and
cause the audio device to sequentially output sonified representations of two or more data points that are represented by multiple cells in the row or the column.

10. The system of claim 1, wherein the memory device comprises program code for a plugin or an extension for a website browser, the program code being executable by the processing device for causing the processing device to detect the metadata in a webpage and generate the interactive interface using the metadata.

11. The system of claim 1, wherein the interaction is a voice command received via an audio input device.

12. A method comprising:
  receiving, by a processing device, metadata that describes a plurality of data points for a chart;
  displaying, by the processing device, the chart and an input element associated with the chart within a graphical user interface (GUI);
  detecting, by the processing device, an interaction with the input element;
  in response to detecting the interaction with the input element:
    visually removing, by the processing device, the chart so that the chart is no longer visible within the GUI; and
    generating, by the processing device, an interactive interface within the GUI using the metadata, wherein the interactive interface is different from the chart, and wherein the interactive interface includes a matrix of cells, each cell in the matrix corresponding to a respective data point among the plurality of data points described by the metadata;
  detecting, by the processing device, an interaction with a cell in the matrix, the interaction indicating that a sonified representation of a data point corresponding to the cell is to be output; and
  based on detecting the interaction:
    determining, by the processing device, at least two sound characteristics for the sonified representation using a portion of the metadata describing the data point, the at least two sound characteristics each audibly representing a different aspect of the data point; and
    transmitting, by the processing device, an audio signal to an audio device, the audio signal being configured to cause the audio device to output the sonified representation having the at least two sound characteristics.

13. The method of claim 12, wherein:
  the data point includes an X coordinate, a Y coordinate, and a Z coordinate;
  the at least two sound characteristics comprise a first sound characteristic that audibly represents the X coordinate, a second sound characteristic that audibly represents the Y coordinate, and a third sound characteristic that audibly represents the Z coordinate;
  the first sound characteristic comprises a pan setting for panning the sonified representation between at least two speakers included in the audio device; and
  the second sound characteristic comprises a pitch of the sonified representation.

14. The method of claim 12, further comprising:
  receiving a command indicating that another sonified representation of another data point among the plurality of data points is to be output;
  determining that the other data point has a value that is missing using another portion of the metadata describing the other data point; and
  based on receiving the command and determining that the value is missing, causing the audio device to output a sound indicating that the value is missing.

15. The method of claim 12, further comprising:
  receiving a command indicating that sonified representations of two or more data points among the plurality of data points are to be played in a sequential order within a user-defined timespan;
  determining the sonified representations of the two or more data points; and
  based on receiving the command, causing the audio device to output the sonified representations of the two or more data points in the sequential order within the user-defined timespan.

16. The method of claim 12, further comprising:
  determining that an audio-output parameter is set to a chord setting; and
  based on detecting the interaction and determining that the audio-output parameter is set to the chord setting:
    determining a row or a column in the matrix that includes the cell; and
    causing the audio device to concurrently output sonified representations of two or more data points that are represented by multiple cells in the row or the column.

17. The method of claim 12, further comprising:
  determining that an audio-output parameter is set to a melody setting; and
  based on detecting the interaction and determining that the audio-output parameter is set to the melody setting:
    determining a row or a column in the matrix that includes the cell; and
    causing the audio device to sequentially output sonified representations of two or more data points that are represented by multiple cells in the row or the column.

18. The method of claim 12, further comprising:
  detecting that the metadata is in a webpage using a plugin or an extension for a website browser;
  based on detecting that the metadata is in the webpage, obtaining the metadata from the webpage; and
  generating the interactive interface using the metadata.

19. A non-transitory computer-readable medium comprising program code that is executable by a processing device for causing the processing device to:
  receive metadata that describes a plurality of data points for a chart;
  display the chart and an input element associated with the chart within a graphical user interface (GUI);
  detect an interaction with the input element;
  in response to detecting the interaction with the input element:
    visually remove the chart so that the chart is no longer visible within the GUI; and
    generate an interactive interface within the GUI using the metadata, wherein the interactive interface is different from the chart, and wherein the interactive interface includes a matrix of cells, each cell in the matrix corresponding to a respective data point among the plurality of data points described by the metadata;
  detect an interaction with a cell in the matrix, the interaction indicating a sonified representation of a data point corresponding to the cell is to be output; and
  based on detecting the interaction:
    determine at least two sound characteristics for the sonified representation using a portion of the metadata describing the data point, the at least two sound characteristics each audibly representing a different aspect of the data point; and
    transmit an audio signal to an audio device, the audio signal being configured to cause the audio device to output the sonified representation having the at least two sound characteristics.

20. The non-transitory computer-readable medium of claim 19, wherein:

the at least two sound characteristics comprise a first sound characteristic and a second sound characteristic;
the first sound characteristic comprises a pan setting for panning the sonified representation between at least two speakers included in the audio device; and
the second sound characteristic comprises a pitch of the sonified representation.

21. The non-transitory computer-readable medium of claim 20, wherein:
the data point includes an X coordinate and a Y coordinate; and
further comprising program code that is executable by the processing device for causing the processing device to determine the first sound characteristic and the second sound characteristic such that the pan setting represents the X coordinate of the data point and the pitch represents the Y coordinate of the data point.

22. The non-transitory computer-readable medium of claim 21, wherein:
the data point further includes a Z coordinate;
the at least two sound characteristics includes a third sound characteristic that audibly represents the Z coordinate; and
further comprising program code that is executable by the processing device for causing the processing device to determine the third sound characteristic.

23. The non-transitory computer-readable medium of claim 19, further comprising program code that is executable by the processing device for causing the processing device to:
receive a command indicating that another sonified representation of another data point among the plurality of data points is to be output;
determine that the other data point has a value that is missing using another portion of the metadata describing the other data point; and
based on receiving the command and determining that the value is missing, cause the audio device to output a sound indicating that the value is missing.

24. The non-transitory computer-readable medium of claim 19, further comprising program code that is executable by the processing device for causing the processing device to:
receive a command indicating that sonified representations of two or more data points among the plurality of data points are to be played in a sequential order within a user-defined timespan;
determine the sonified representations of the two or more data points; and
based on receiving the command, cause the audio device to output the sonified representations of the two or more data points in the sequential order within the user-defined timespan.

25. The non-transitory computer-readable medium of claim 19, further comprising program code that is executable by the processing device for causing the processing device to:
determine that an audio-output parameter is set to a chord setting; and
based on detecting the interaction and determining that the audio-output parameter is set to the chord setting:
determine a row or a column in the matrix that includes the cell; and
cause the audio device to concurrently output sonified representations of two or more data points that are represented by multiple cells in the row or the column.

26. The non-transitory computer-readable medium of claim 19, further comprising program code that is executable by the processing device for causing the processing device to:
determine that an audio-output parameter is set to a melody setting; and
based on detecting the interaction and determining that the audio-output parameter is set to the melody setting:
determine a row or a column in the matrix that includes the cell; and
cause the audio device to sequentially output sonified representations of two or more data points that are represented by multiple cells in the row or the column.

27. The system of claim 1, wherein the chart includes a graph.

28. The system of claim 1, wherein the matrix of cells includes one or more visual characteristics that are user-customizable via the interactive interface.

29. The method of claim 12, wherein the chart includes a graph.

30. The non-transitory computer-readable medium of claim 19, wherein the chart includes a graph.

* * * * *